(12) United States Patent
Kratz et al.

(10) Patent No.: US 7,604,374 B2
(45) Date of Patent: Oct. 20, 2009

(54) ILLUMINATED ALTERNATOR AND METHOD OF OPERATION

(75) Inventors: Steven L. Kratz, Rancho Palos Verdes, CA (US); John G. Agnitch, Rolling Hills Estates, CA (US)

(73) Assignee: Motorcar Parts of America, Inc., Torrance, CA (US)

( * ) Notice: Subject to any disclaimer, the term of this patent is extended or adjusted under 35 U.S.C. 154(b) by 332 days.

(21) Appl. No.: 11/340,966

(22) Filed: Jan. 27, 2006

(65) Prior Publication Data

US 2006/0226720 A1 Oct. 12, 2006

Related U.S. Application Data

(60) Provisional application No. 60/648,328, filed on Jan. 28, 2005.

(51) Int. Cl.
*F21S 8/10* (2006.01)
(52) U.S. Cl. ............... 362/231; 362/459; 362/545; 310/73; 310/89; 310/68 D
(58) Field of Classification Search ............ 362/231, 362/459, 543, 544, 545, 191; 310/73, 89, 310/68 D; 290/36 A
See application file for complete search history.

(56) References Cited

U.S. PATENT DOCUMENTS

| 1,913,765 | A | | 6/1933 | Marshall |
| 2,986,614 | A | * | 5/1961 | Minch ................ 200/61.5 |
| 3,041,484 | A | * | 6/1962 | Freer et al. ............ 310/68 D |
| 4,298,869 | A | * | 11/1981 | Okuno ................... 345/82 |
| 4,558,529 | A | | 12/1985 | Chang et al. |
| 4,775,919 | A | | 10/1988 | Pearsall et al. |
| 5,016,144 | A | | 5/1991 | DiMaggio |
| 5,548,274 | A | | 8/1996 | Anderson et al. |
| 5,570,951 | A | * | 11/1996 | Bertling et al. ........... 362/231 |
| 5,580,093 | A | | 12/1996 | Conway |
| 6,116,763 | A | | 9/2000 | King |
| 6,126,299 | A | * | 10/2000 | Hypes et al. ............. 362/259 |
| 6,147,426 | A | * | 11/2000 | Lepi et al. ................ 310/91 |

(Continued)

FOREIGN PATENT DOCUMENTS

DE 019934861 C1 6/2000

(Continued)

*Primary Examiner*—Sharon E Payne
(74) *Attorney, Agent, or Firm*—Pillsbury Winthrop Shaw Pittman LLP

(57) ABSTRACT

An illuminated alternator for automotive and other motorized vehicles includes a plurality of illumination devices, such as light emitting diodes, bulbs or lasers. The illumination devices are positioned within the alternator. When the illumination devices are activated, light from the illumination devices is reflected by surfaces of the alternator frame and exits the alternator frame through one or more vents, thus providing a glowing or illumination effect that radiates from within the alternator. Different numbers and colors of illumination devices may be used, including illumination devices that emit red, yellow, green and blue light. Illumination devices can also be activated in different sequences and patterns, such as periodically, intermittently, and randomly. An alternator may have illumination devices that are the same or different colors. Illumination devices that are simultaneously active may emit colors that are mixed so that the illumination effect is a color that is different than the colors of the illumination devices.

53 Claims, 26 Drawing Sheets

U.S. PATENT DOCUMENTS

| | | |
|---|---|---|
| 6,382,820 B1 | 5/2002 | Chung |
| 6,623,134 B1 | 9/2003 | Chang |
| 6,644,839 B2 | 11/2003 | Lee |
| 6,655,823 B2 * | 12/2003 | Chang ........................ 362/487 |
| 2003/0198059 A1 | 10/2003 | Castro |
| 2003/0202356 A1 | 10/2003 | Hung |
| 2003/0223222 A1 | 12/2003 | Yu |
| 2003/0231956 A1 | 12/2003 | Lin |
| 2004/0114385 A1 | 6/2004 | Ho |

FOREIGN PATENT DOCUMENTS

| | | | |
|---|---|---|---|
| JP | 56057533 A | * | 5/1981 |
| JP | 2002166374 A | | 6/2002 |
| WO | WO/97/34779 | | 9/1997 |

* cited by examiner (Periodic)

(Random)

ILLUMINATED ALTERNATOR AND METHOD OF OPERATION

CROSS-REFERENCE TO RELATED APPLICATION

The present application claims priority under 35 U.S.C. §119 of U.S. Provisional Application No. 60/648,328, filed Jan. 28, 2005, the contents of which are incorporated herein by reference.

FIELD OF THE INVENTION

The present invention relates generally to alternators for motor vehicles and, more particularly, to illuminated alternators for motor vehicles.

BACKGROUND

Various after market accessories have been used to illuminate components of a motor vehicle, such the underside of a vehicle, wheels and exhaust pipes. One known device is a neon light that is attached to an underside of the vehicle to generate a glowing effect that radiates from underneath the vehicle.

Another known device is attached to an exterior of a body panel and directed to a wheel to illuminate the wheel. The lighting device includes a sensor that monitors the rotation of the tire and has components to synchronize or strobe light flashes from a flash generator with information a sidewall of the tire. Thus, the tire appears to be stationary. A further example of a known lighting accessory for wheels is a device that provides a lighting effect to, through and around a wheel of a vehicle. This is done by shining a light from a light source on the inside portion of the wheel rim, which has slots, holes or grooves.

Other accessories have been used to illuminate an exhaust or tailpipe of an vehicle. One known device describes an illuminating apparatus that includes fan blades positioned within an exhaust pipe. Discharged exhaust gas flows drive the fan blades, which rotate and drive components to generate electric power to activate light emitting diodes (LED's), thereby forming a rotating lighting ring.

Known illumination devices for motor vehicles, however, have been used primarily to illuminate exterior components rather than internal components of a motor vehicle, such as components in the engine compartment. It is known to include a light within the engine compartment, e.g., a light that is attached to an underside of a hood, to enable a person to view the engine in a dark environment. However, these lighting systems are not integrated into engine components, have limited uses and typically do not improve the aesthetic appearance of the vehicle.

It would be desirable to have aesthetic illumination effects under the hood of an vehicle to further improve the appearance of the vehicle and to provide further customization options. Embodiments of the invention fulfill these needs.

SUMMARY

In accordance with one embodiment, an illuminated alternator for a motor vehicle includes a shaft, a pulley attached the shaft, a rotor attached to the shaft, and a stator, the rotor rotating within the stator and being driven by an engine belt that drives the pulley, alternator case having one or more vents and an illumination device. The illumination device generates light when activated, and the light from the illumination device is visible through a vent of the case.

In accordance with another embodiment, an illuminated alternator for a motor vehicle includes a shaft, a pulley attached the shaft, a stator, and a rotor that rotates within the stator and is driven by a belt that drives the pulley, an alternator frame and a plurality of light emitting diodes. The frame defines a plurality of vents. Each light emitting diode emits light when activated. The light is reflected by an inner surface of the alternator frame and radiates from the alternator frame through a vent.

In accordance with a further alternative embodiment, an illuminated alternator for a motor vehicle includes a shaft, a pulley attached the shaft, a stator, and a rotor that rotates within the stator and is driven by a belt that drives the pulley, a drive end frame cover and a plurality of light emitting diodes. The drive end frame cover defines a plurality of vents. Each light emitting diode is positioned in a recess defined in an inner surface of the drive end frame cover and emits light when activated. Light from the light emitting diodes is reflected by an inner surface of the drive end frame cover and radiates form the cover though a vent.

According to another alternative embodiment, an illuminated alternator for a motor vehicle includes a shaft, a pulley attached the shaft, a stator, and a rotor that rotates within the stator and is driven by a belt that drives the pulley, a drive end frame cover, a plurality of light emitting diodes and a rear end frame cover. The drive or front cover defines a plurality of vents includes recesses formed in an inner surface thereof. A light emitting diode is positioned in a recess. The rear cover is connected to the drive cover to enclose the inner components of the alternator and the light emitting diodes, which emit light when activated. The light emitting diodes are arranged symmetrically around an inner perimeter of the drive end frame cover, and light from the light emitting diodes is reflected by an inner surface of the drive cover and radiates through a vent. Another alternative embodiment is directed to a method of illuminating an alternator of a motor vehicle. The method includes installing at least one illumination device, such as a light emitting diode, within an alternator frame that defines a vent. The illumination device is activated so that light radiates from the alternator frame through a vent.

In various embodiments, an illumination device in the alternator can be a light emitting diode, a halogen bulb, a laser, or another suitable device. Different colors (such as green, red, blue, yellow, or purple), numbers, sizes and arrangements of illumination devices can be utilized. Light can be emitted directly through a vent or reflected from an inner surface of the alternative through the vent. The illumination device can be activated continuously, periodically, intermittently or randomly. Thus, various illumination sequences, colors and patterns can be implemented.

The illumination devices can be electrically connected existing alternator components and powered by a battery of the motor vehicle. The alternator case can match the illumination effect. A switch can be used to selectively enable the illumination so that it can be switched on and off.

Other objects and features of embodiments will become apparent from consideration of the following description taken in conjunction with the accompanying drawings.

DETAILED DESCRIPTION OF ILLUSTRATED EMBODIMENTS

Embodiments of the invention provide an alternator that includes an illumination device or light source that enhances the aesthetic appearance of the alternator and the engine compartment of a motor vehicle. A motor vehicle can be an automobile or car, a truck, a motorcycle, a all-terrain vehicle, a boat and other motor vehicles. For purposes of explanation, not limitation, this specification generally refers to motor vehicles, in particular, automobiles or cars. Embodiments advantageously integrate an illumination device, such as one or more LED's, within an alternator so that light from an LED radiates from within the alternator, e.g., is reflected by inner surfaces of the alternator case and emitted through vents or aperture of the alternator, to provide a visually appealing glowing effect. Various types and colors of light sources can be used, and they can be controlled to be activated continuously, intermittently, periodically and in various other sequences and patterns.

Figure 1:
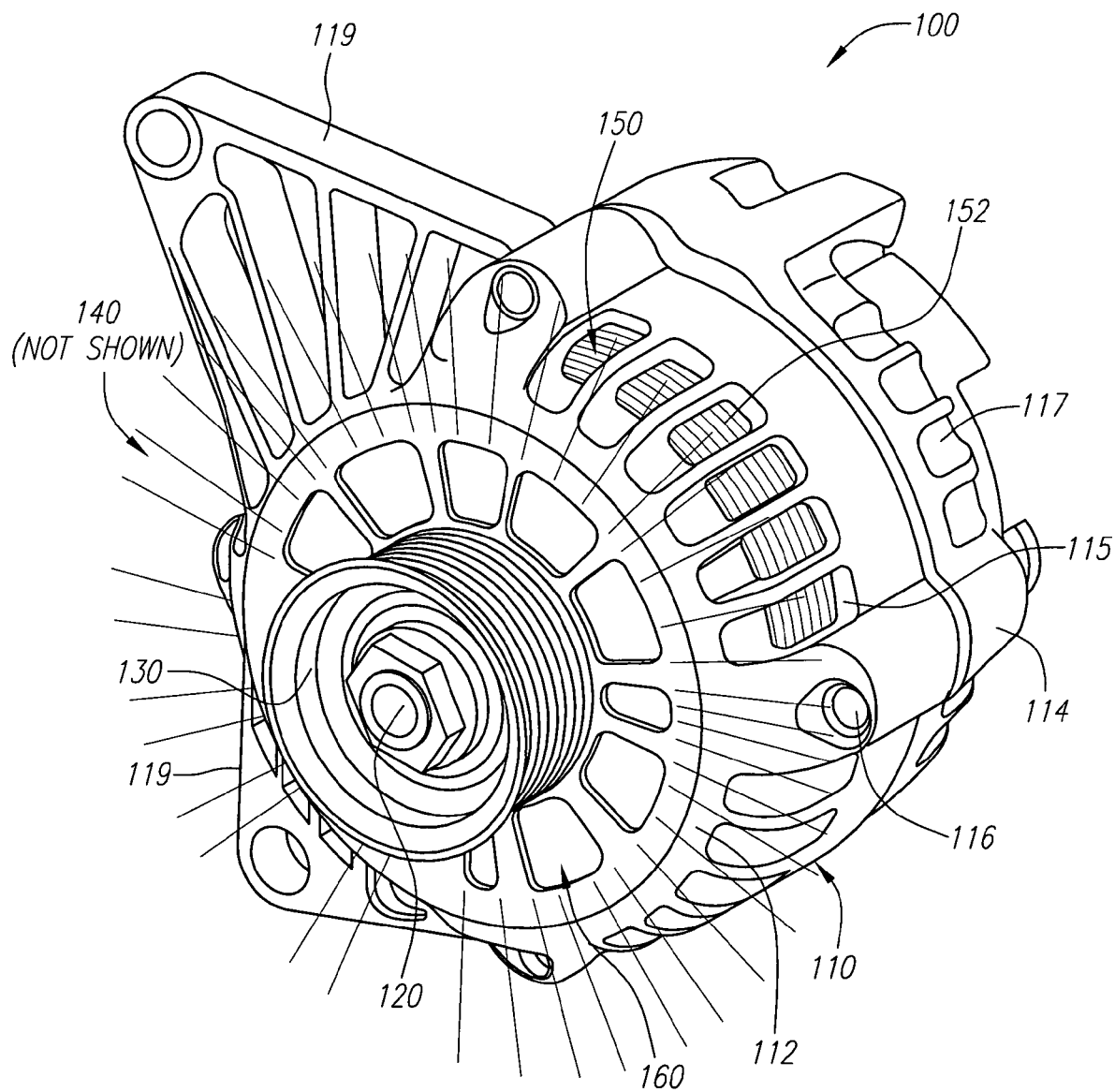
FIG. 1 illustrates an assembled illuminated alternator having an illumination device integrated therein according to one embodiment.
Figure 2:
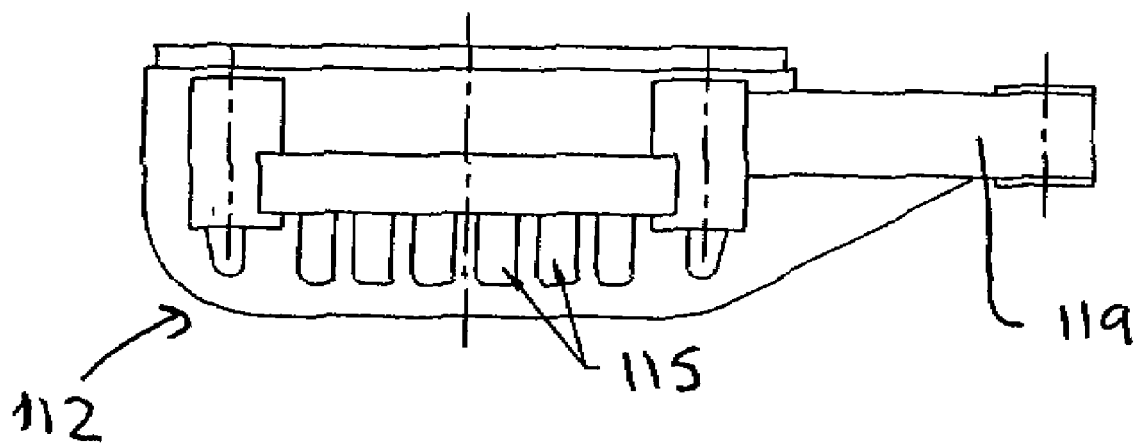
FIG. 2 is a side view of a drive end frame cover of an illuminated alternator.

Referring to FIGS. 1 and 2, an illuminated alternator 100 according to one embodiment works with a battery of a motor vehicle to supply power when the motor vehicle is running. The alternator 100 includes a case or frame 110, such as an aluminum case, a shaft 120, a pulley 130, a rotor 140 (not shown in FIG. 1), a stator 150, an illumination device 160, a rectifier or rectifier bridge (not shown in FIG. 1) and a voltage regulator (not shown in FIG. 1). Persons skilled in the art will appreciate that embodiments can be used with various alternator designs and configurations. Accordingly, the description of known alternator components is provided as one exemplary, non-limiting alternator configuration that can be used with embodiments.

In the illustrated embodiment, the case 110 includes two covers—a drive end frame cover 112 and a rear frame cover 114. The driven end frame cover 112 typically faces the front of the vehicle in the drive direction, and the rear frame cover 114 typically faces the rear of the vehicle. The rear end frame cover 114 is connected to the drive end frame cover 112 with a fastener 116 to enclose the inner components of the alternator 100, including portions of the shaft 120, the rotor 140, the stator 150 and the illumination device 160, inside the case 110. The case 110 also includes circulation vents or apertures 115, which allow heat that is generated by components of the alternator 100 to be released from the interior of the alternator 100. In the illustrated embodiment, the drive end frame cover 112 includes a plurality of vents 115, and the rear end frame cover 114 also includes a plurality of vents 117. FIG. 2 further illustrates a drive end frame cover 112 and the vents 115 formed therein. The drive end frame cover 112 can have one or more mounting flanges 119, which are used to attach the alternator 100 to corresponding attachment points on the motor vehicle engine.

The shaft 120 is rotatably disposed in the case 110, and the pulley 130 is secured to an end of the shaft 120. The rotor 140 is also attached to the shaft 120. In use, an alternator drive belt (not shown in FIGS. 1 and 2) is placed around the pulley 130 and is driven by an engine crankshaft (not shown in FIGS. 1 and 2), causing the pulley 130 and shaft 120 to rotate which, in turn, causes the rotor 140 attached to the shaft 120 to rotate within the stator 150. The stator 150 is secured to an inner wall in the case 110. The rotation of the rotor 140 in the stator 150 generates an alternating magnetic field. Windings 152 of the stator 150 develop voltage, and alternating current (AC) flows from the induced magnetic field of the rotor 150. AC current is converted into direct current (DC) by the rectifier (not shown). The voltage regulator monitors battery and stator 150 voltages and adjusts the operation of the rotor 140 to control DC that is output by the alternator 100.

Persons skilled in the art will appreciate that the alternator 100 for a motor vehicle includes other known components, such as brushes, a slip ring, a heat sink and sometimes a fan. For purposes of explanation, discussion of these other known components and a more detailed discussion of how an alternator generally operates are omitted since persons skilled in the art understand how known alternators for motor vehicles function.

The illumination device 160 is integrated within the alternator 100 and connected to existing electrical components of the alternator 100. As FIG. 1 graphically shows, the illumination device 160 emits light through the vents or apertures 115 of the drive end frame cover 112, thereby creating a visually appealing glowing effect from within the alternator 100. For example, light emitted from the illumination device 160 can be reflected by an inner surface of the drive end frame cover 112 and through the vents 115. Light can also be emitted directly through the vents 115 without reflection from an internal surface of the cover 112. The illumination device 160 can be, for example, a halogen, a fluorescent, a laser, a neon, and other types of lighting devices. For purposes of explanation, not limitation, this specification refers to an LED illumination device 160.

The LED 160 can be powered by a battery of the motor vehicle so that the aesthetic glowing effect can be generated while the vehicle is running and also when the vehicle is turned off. For example, an illuminated alternator 100 can provide aesthetic effects to running and moving vehicles having transparent or no hoods. Further, an illuminated alternator 100 can provide aesthetic effects to parked and non-running vehicles, e.g., at a show during which the hoods of vehicles are often raised so that the engine compartment can be viewed. Accordingly, embodiments provide aesthetic enhancements and customization options that were not previously available to consumers. Further aspects of alternative embodiments of an illuminated alternator are discussed in further detail with reference to FIGS. 3-27.

Figure 3:
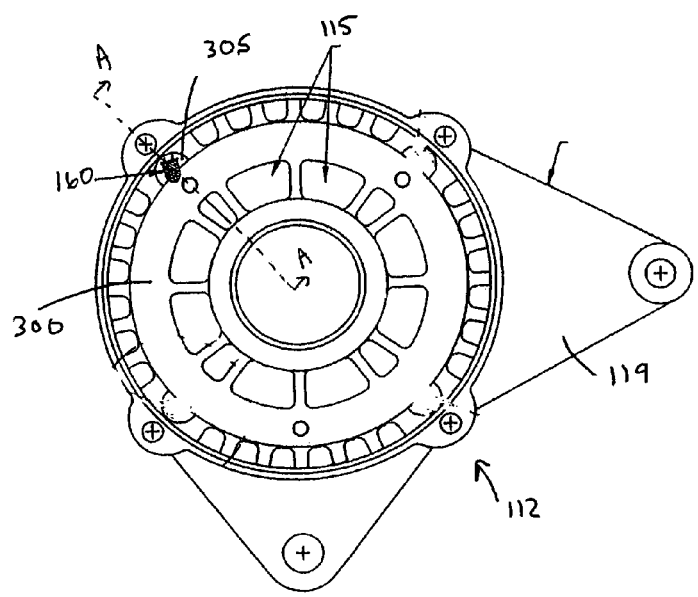
FIG. 3 illustrates an inner surface of a drive end frame alternator cover and an illumination device inside a recess formed in the cover.
Figure 4:
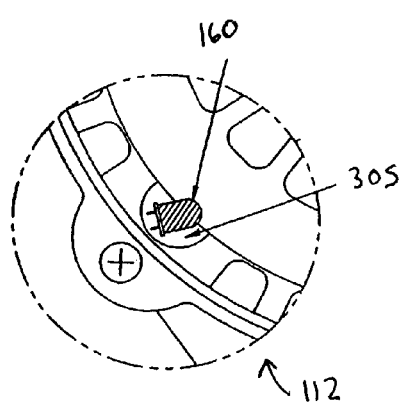
FIG. 4 is an exploded view of a portion of FIG. 3.
Figure 5:
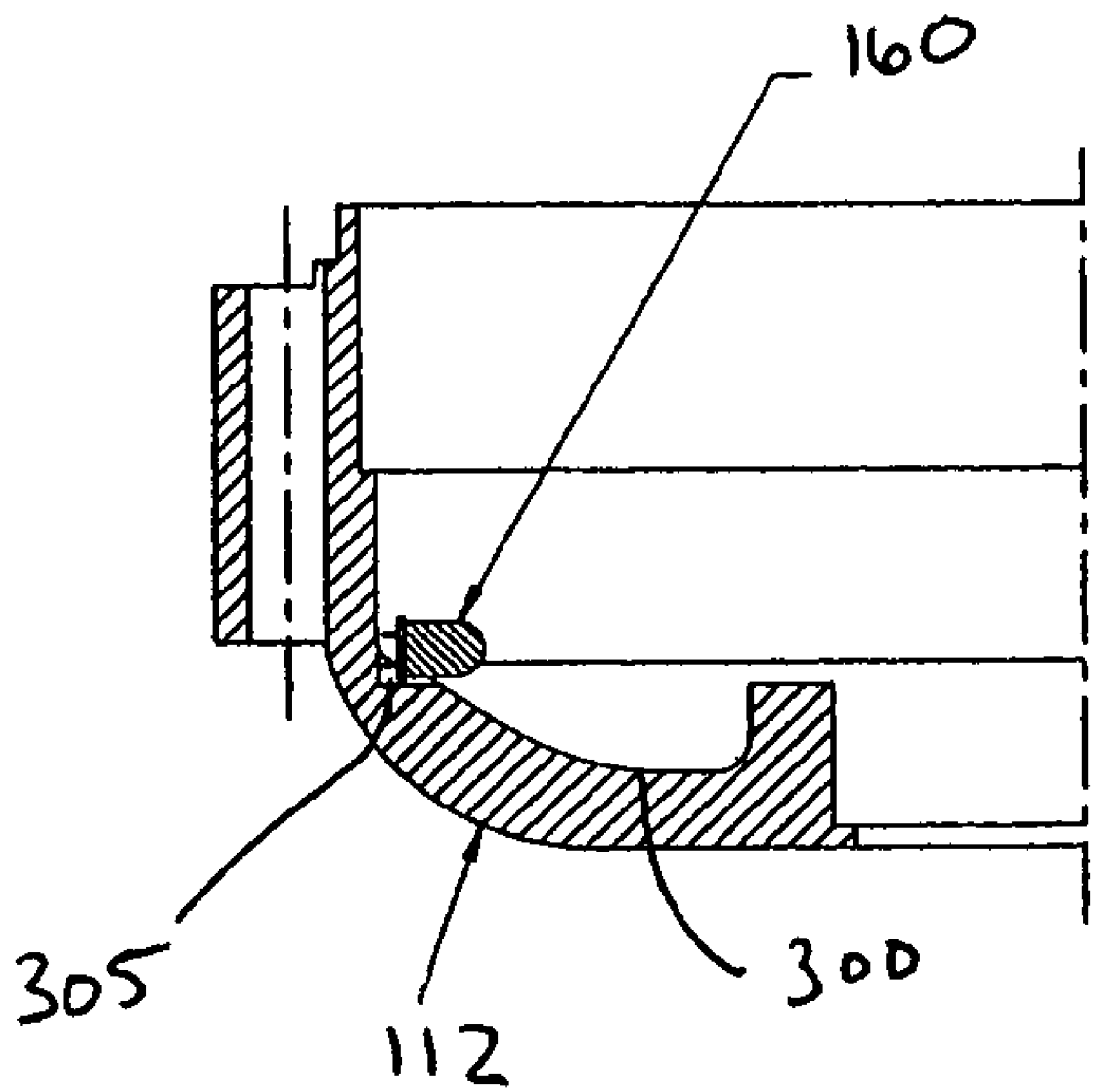
FIG. 5 is a partial cross-sectional view of FIG. 3 along line A-A.

Referring to FIGS. 3-5, according to one embodiment, an LED 160 is enclosed or included within the drive end frame cover 112 of the case 110. FIGS. 3-5 illustrate a drive end frame cover 112 and an LED 160 without other alternator components and wiring for the LED 160 for purposes of explanation and illustration. According to one embodiment, the LED 160 is attached to the inner surface 300 of the drive end frame cover 112. This can be done by positioning the LED 160 within a recess 305 formed in the inner surface 300 of the drive end frame cover 112. If necessary, the recess 305 can be milled into the inner surface 300, which can be, for example, aluminum. The LED 160 can also be fastened to an inner surface 300 using, for example, a suitable adhesive. The LED can also be secured within a clamp or fastener, which is then attached to the inner surface 300. Accordingly, FIGS. 3-5 illustrate one embodiment in which an LED 160 is positioned a recess 305 of the inner surface 300 of the drive end frame cover 112. Persons skilled in the art will appreciate that an LED can be integrated within a case 110 in other manners.

Figure 6:
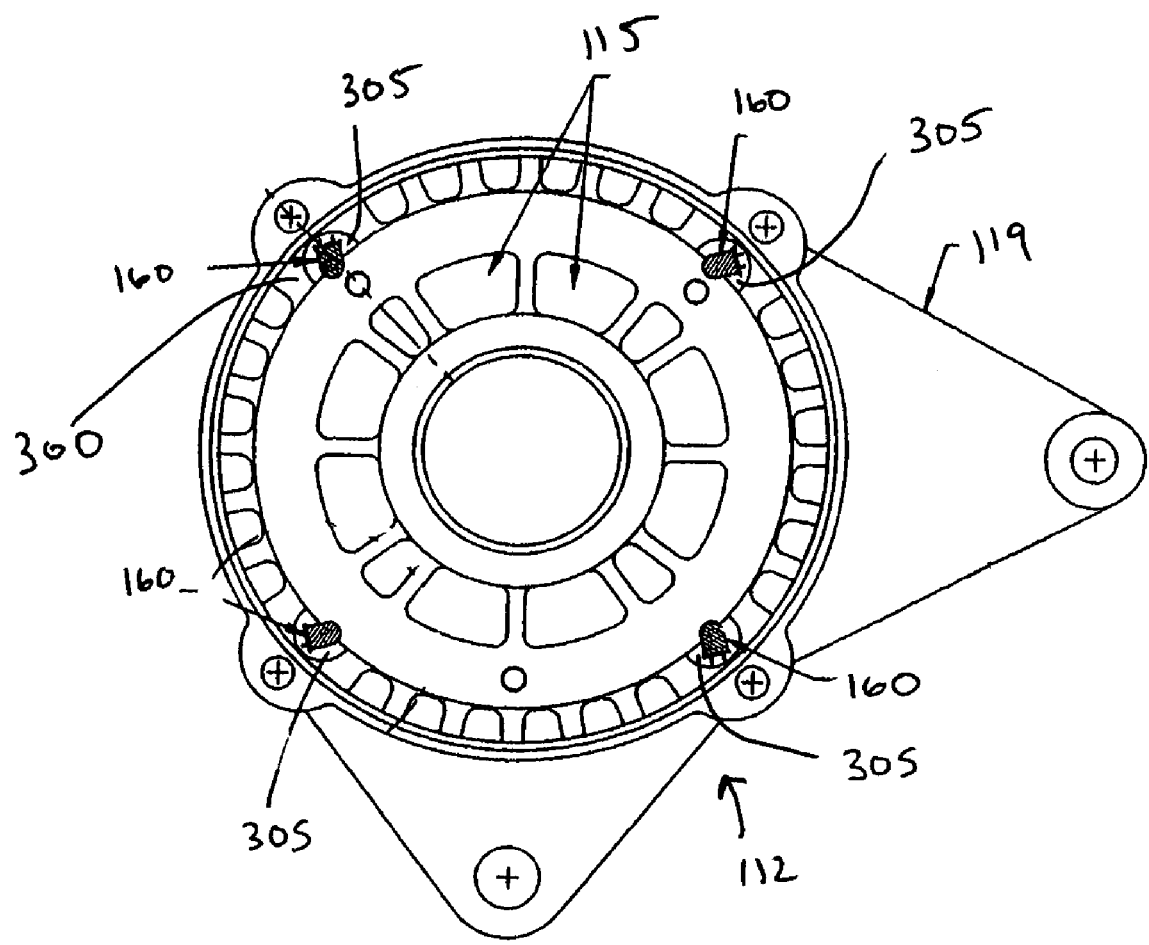
FIG. 6 illustrates an inner surface of an alternator cover and multiple illumination devices inside recesses formed in the cover.

Referring to FIG. 6, according to another embodiment, an illuminated alternator 100 includes multiple LED's 160 rather than a single LED as shown in FIG. 3. The embodiment shown in FIG. 6 includes four LED's 160. Other numbers of LED's 160 can also be used, e.g., two to eight LED's 160. Whether a single LED or multiple LED's 160 are utilized can depend on, for example, the desired intensity of the lighting effect the size of the LED's 160 and the alternator 100, and connection and driving requirements for each LED 160. Thus, there may be cases in which a single LED 160 or other illumination device provides sufficient brightness, whereas in other cases, multiple LED's 160 or other illumination may be necessary. In order to further enhance the brightness of the illumination, if necessary, the inner surface 300 of the drive end frame cover 112 can be coated with a reflective coating if additional reflectability is desired. Another factor concerning whether a single or multiple LED's 160 are utilized is whether it is desirable to selectively illuminate LED's 160 in different patterns, colors and sequences, in which case multiple LED's 160 would be utilized.

In the illustrated embodiment, each LED 160 is positioned in a recess 305 formed in an inner surface 300 of the drive end frame cover 112. Alternatively, the LED 160 can be secured to a surface 305, e.g., with an adhesive, or secured within a clamp or fastener, which is then attached to an inner surface 305 of the drive end frame cover 112. Further, in the illustrated embodiment, the LED's 160 are positioned symmetrically and are equally spaced around an inner perimeter of the drive end frame cover 112. Alternatively, the LED's 160 can be arranged asymmetrically. Asymmetrical configurations may be useful when, for example, only one side or one half of the alternator 100 is visible. In this case, it may be desirable to include a majority or all of the LED's 160 on the visible side of the alternator 100.

FIGS. 7-21 illustrate alternative embodiments in which multiple LED's 160 can be controlled to provide different illumination sequences, patterns, colors and aesthetic effects. For purposes of illustration, not limitation, FIGS. 7-21 illustrate these embodiments with respect to an illuminated alternator 100 having four LED's 160 in the drive end frame cover 112, however, other numbers of LED's 160 and various numbers and types of other illumination devices can be used and positioned within other locations inside the alternator 100.

Figure 7:
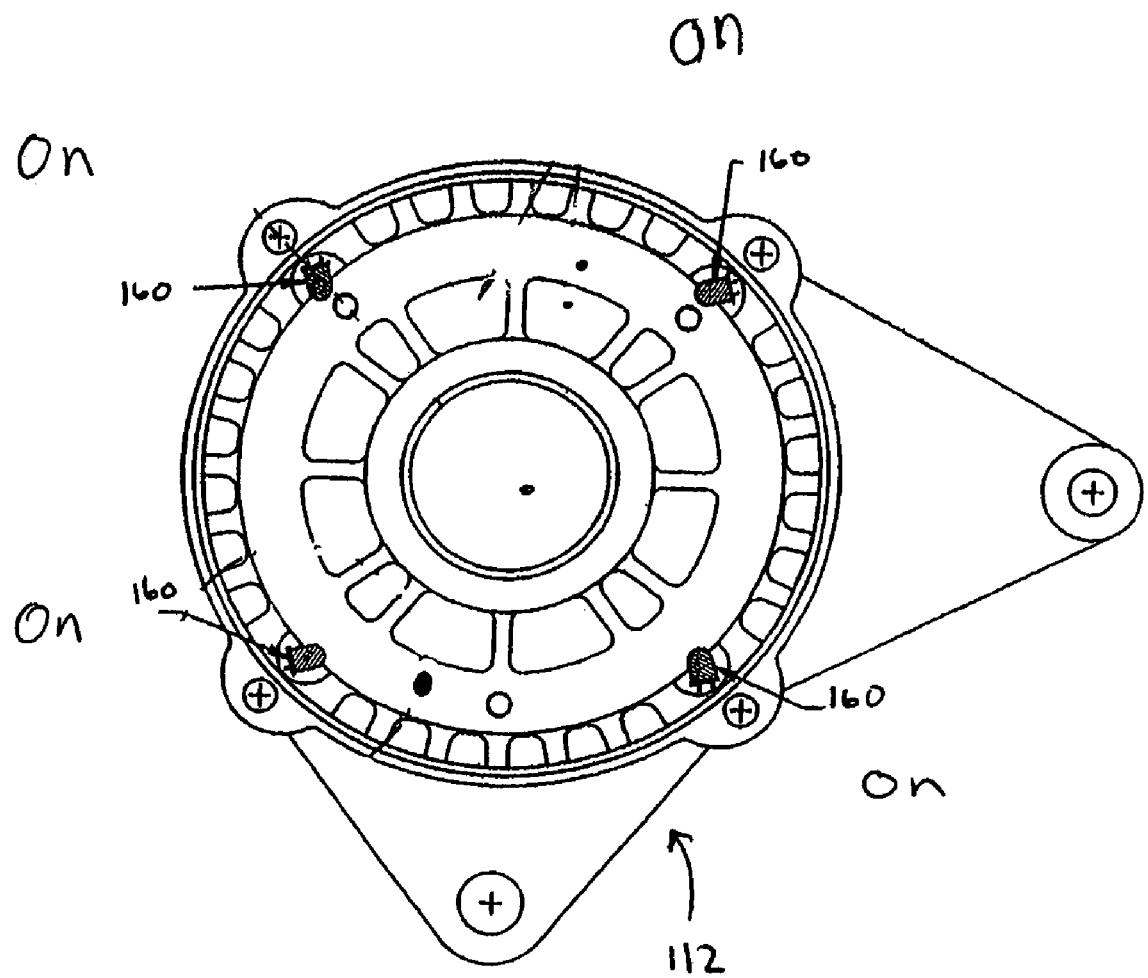
FIG. 7 illustrates illumination devices being active simultaneously.
Figure 9:
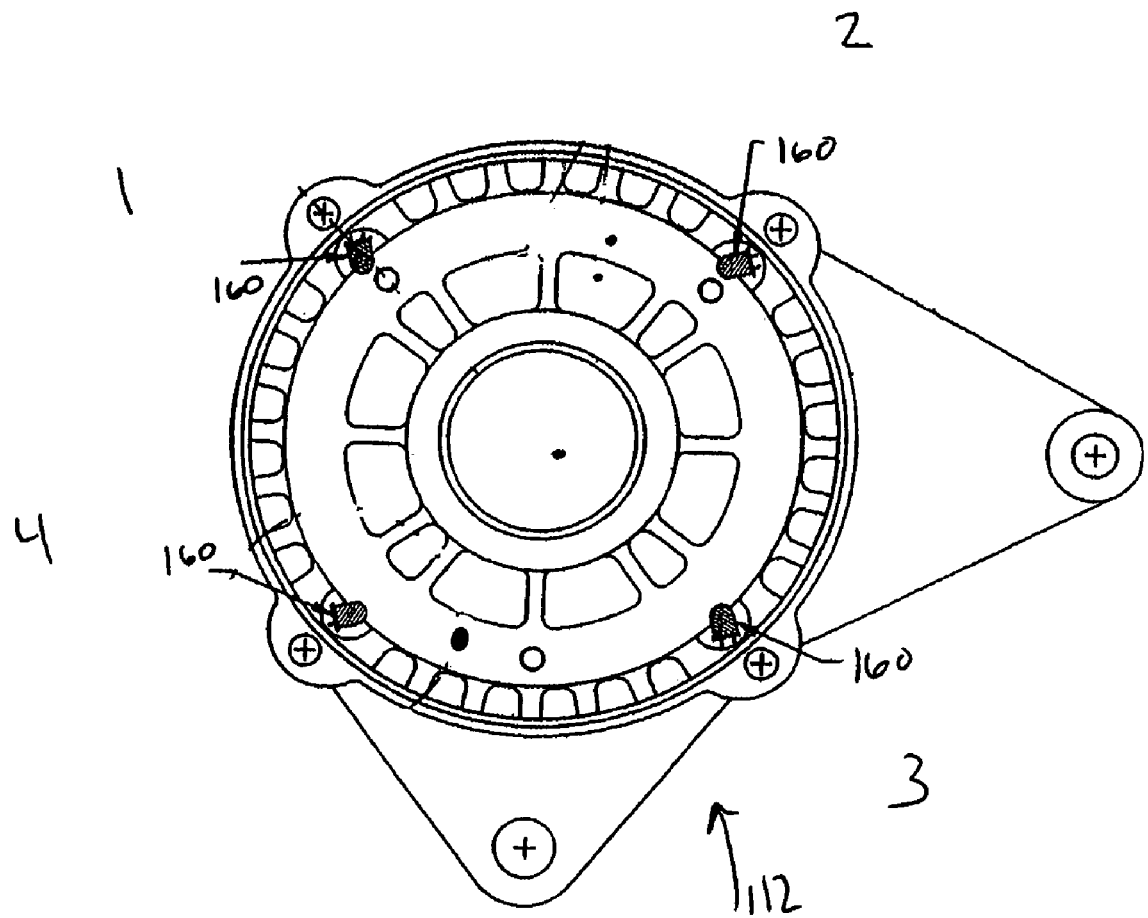
FIG. 9 illustrates illumination devices being activated sequentially.
Figure 10:
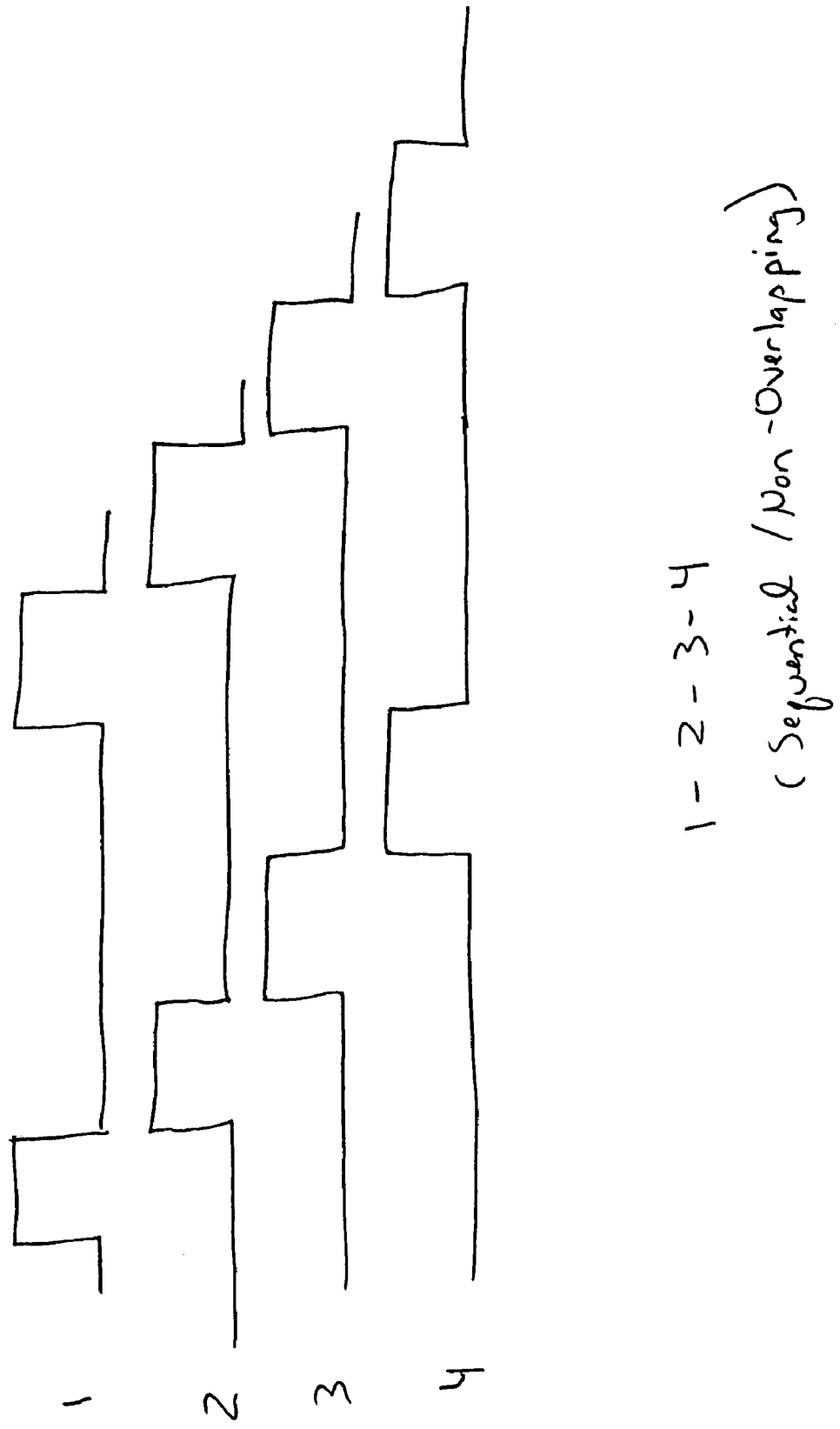
FIG. 10 illustrates illumination devices being activated sequentially and separately.
Figure 11:
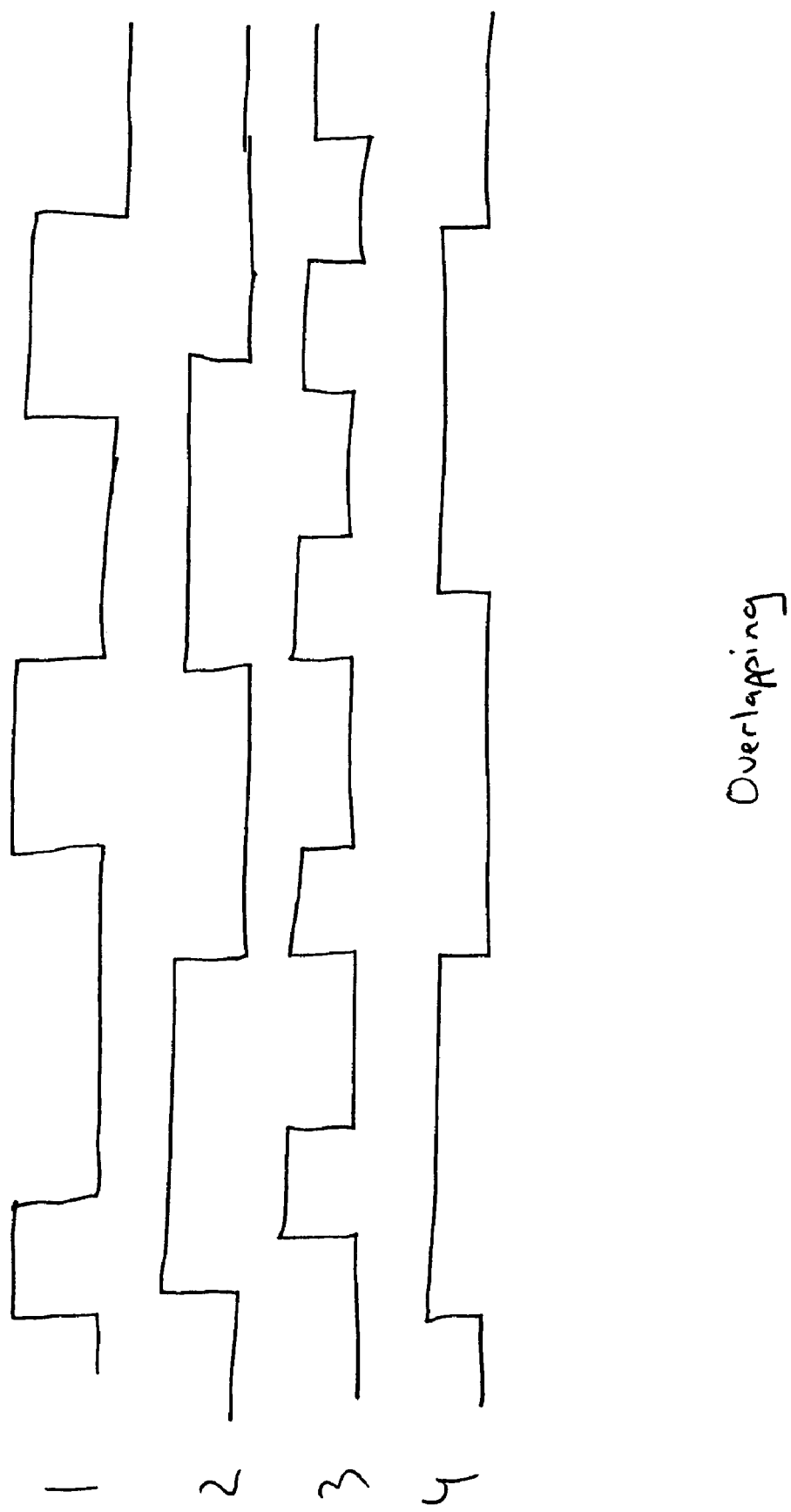
FIG. 11 illustrates two or more illumination devices being activated simultaneously.
Figure 12:
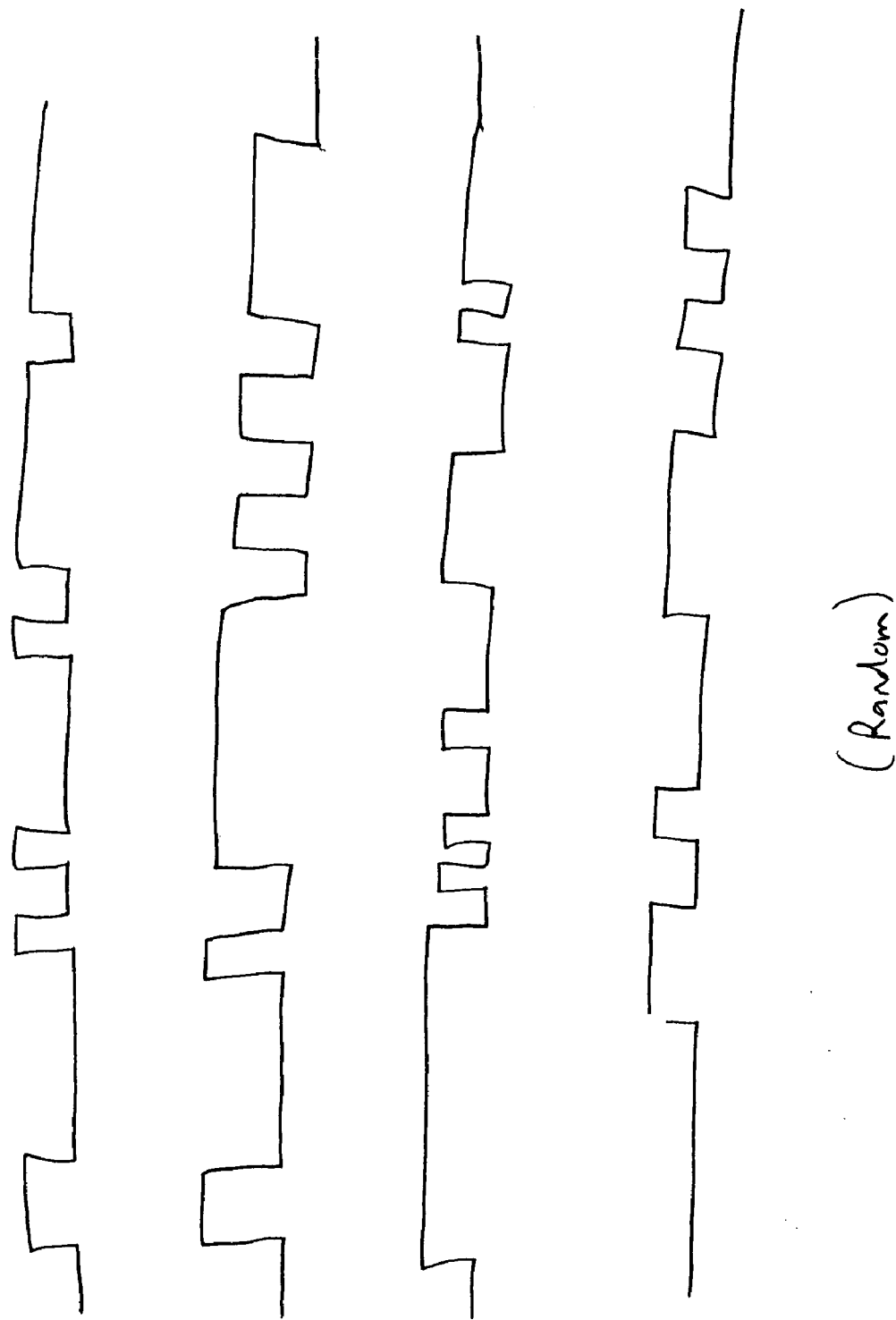
FIG. 12 illustrates illumination devices being activated randomly.

Referring to FIG. 7, according to one embodiment, all of the LED's 160 are illuminated at the same time and continuously. Thus, the aesthetic effect is a continuous illumination. Alternatively, referring to FIG. 8, one or more LED's 160 are selectively activated or illuminated periodically to provide, for example, a strobe effect. Referring to FIGS. 9 and 10, according to another embodiment, individual LED's 160 are selectively illuminated in a particular order. In the illustrated embodiment, LED's 160 are illuminated sequentially in a clockwise direction, as indicated by the 1-2-3-4 order. Each LED 160 may be activated only after a prior LED 160 is inactivated or, alternatively, one or more LED's 160 can be active at the same time another LED 160 is active, as shown in FIG. 11. The sequencing may also be in a counter-clockwise direction. Further, the sequencing can change directions. These sequences and resulting patterns may result in an impression of tracing a circle or portion thereof, and the circle can be defined to different degrees based on the number of LED's 160 and timing. FIG. 12 illustrates a further alternative embodiment in which LED's 160 are illuminated in a random order. Indeed, various sequences, timings and patterns can be used to provide custom illumination effects.

Figure 13:
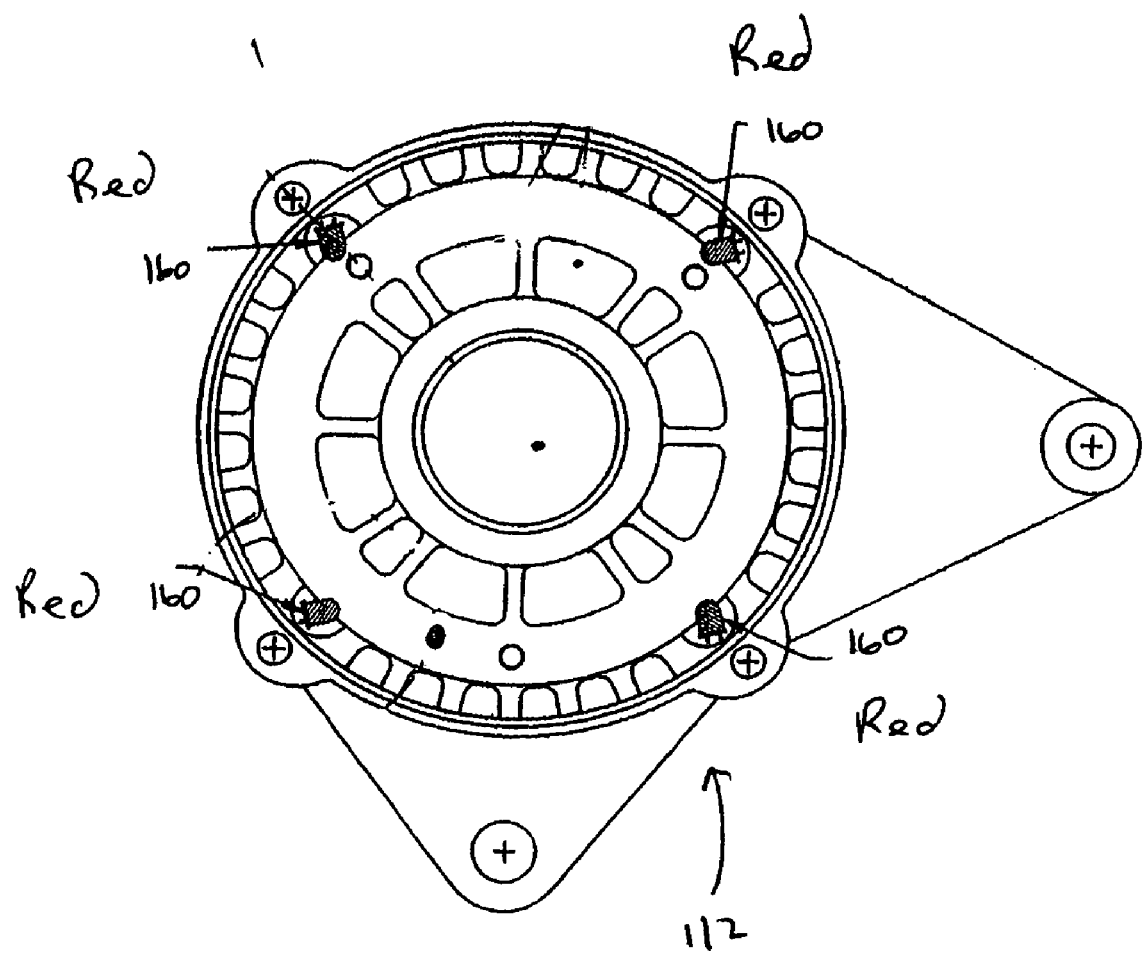
FIG. 13 illustrates illumination devices having the same color.
Figure 14:
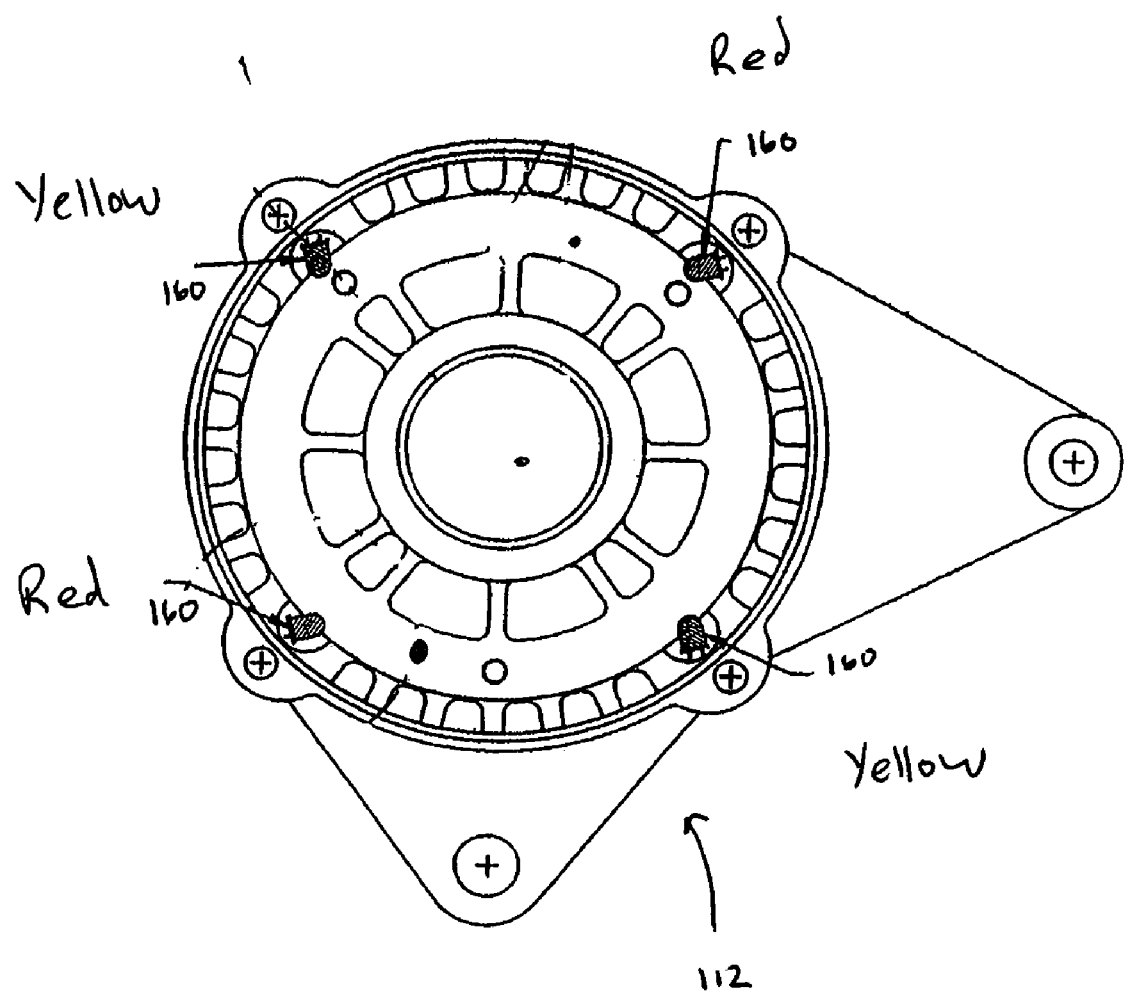
FIG. 14 illustrates illumination devices having two different colors.
Figure 15:
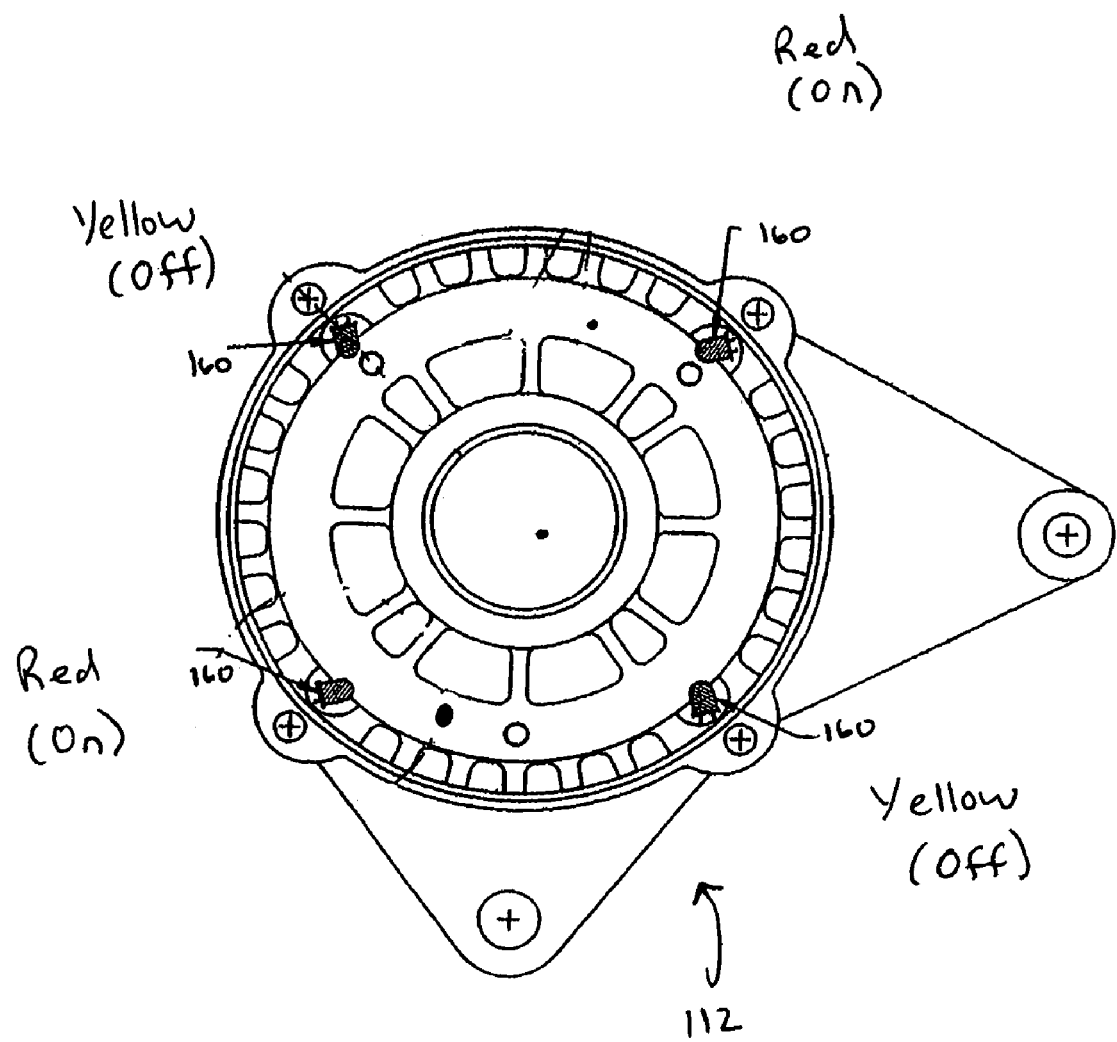
FIG. 15 illustrates illumination devices of a certain color being active at the same time.
Figure 16:
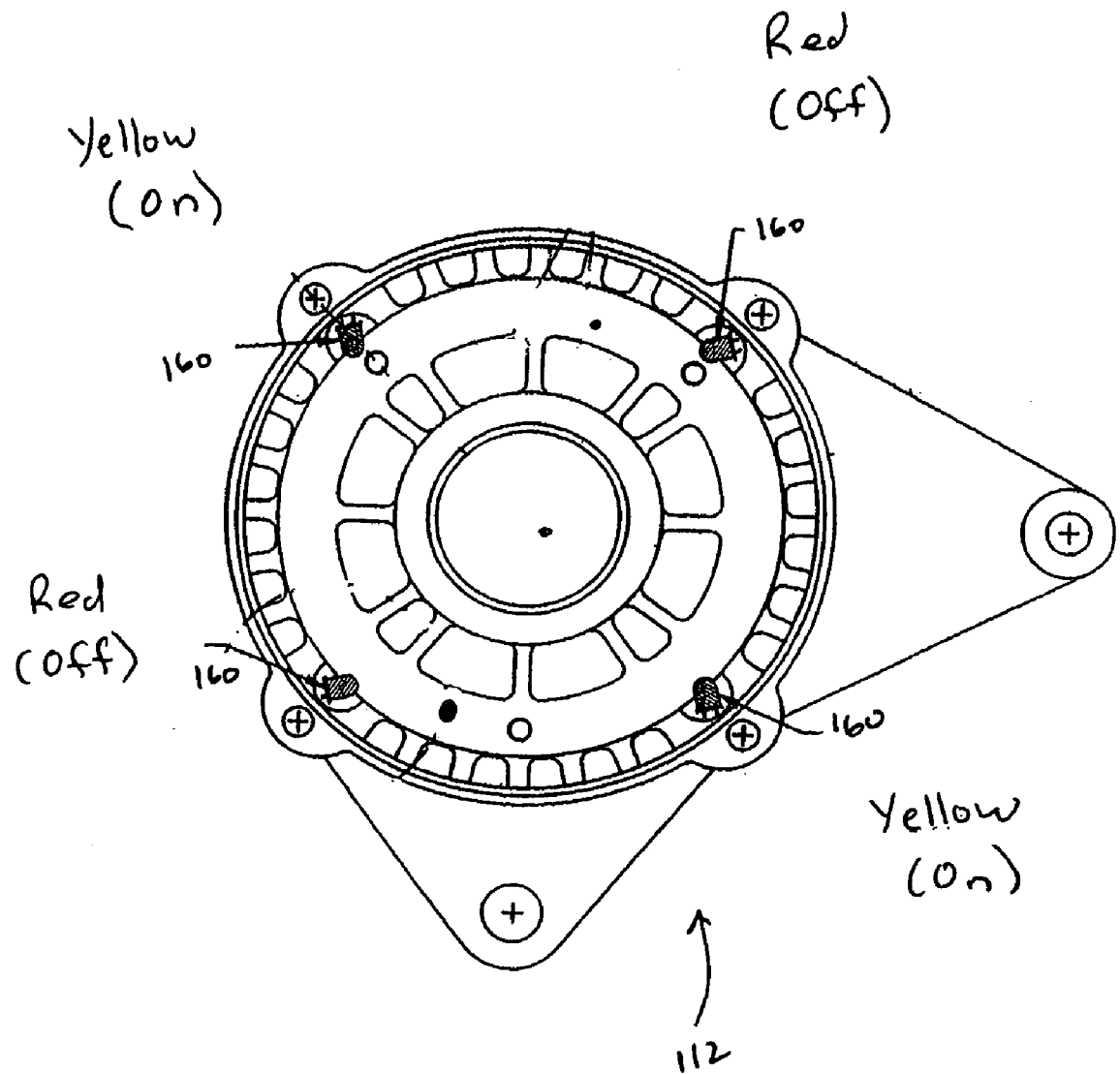
FIG. 16 further illustrates illumination devices of a certain color being active at the same time.
Figure 17:
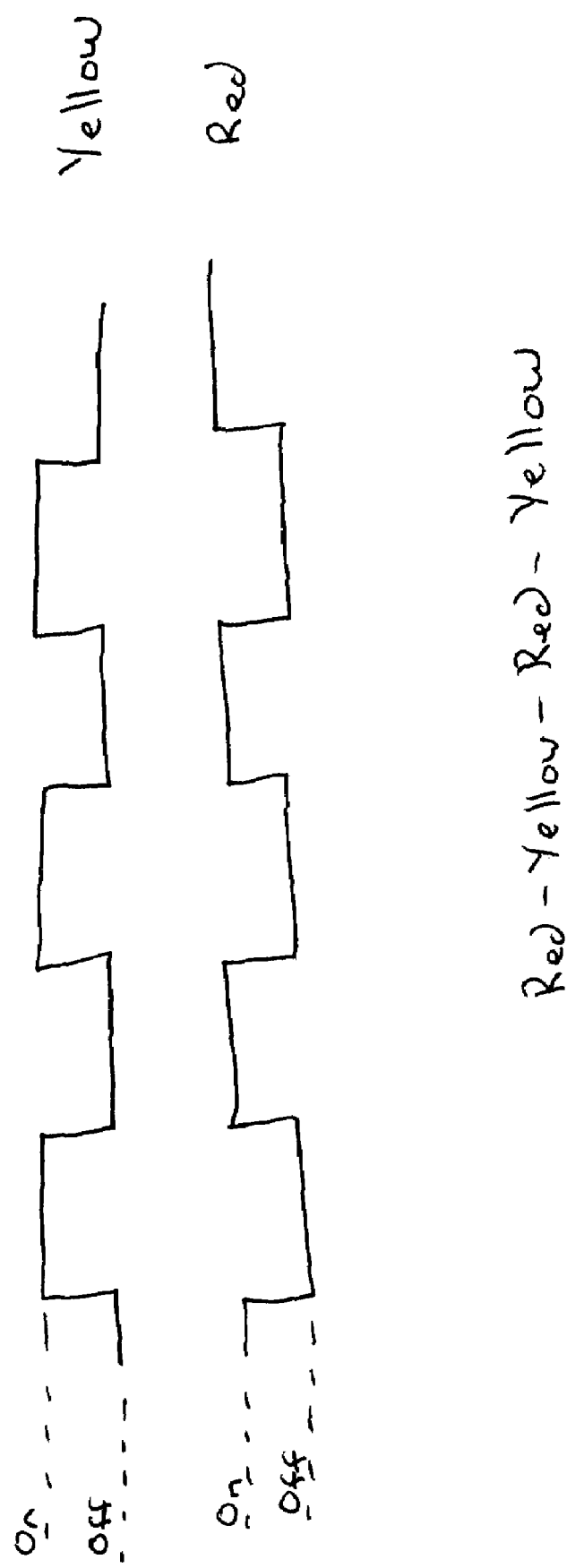
FIG. 17 also further illustrates illumination devices of a certain color being active at the same time.
Figure 18:
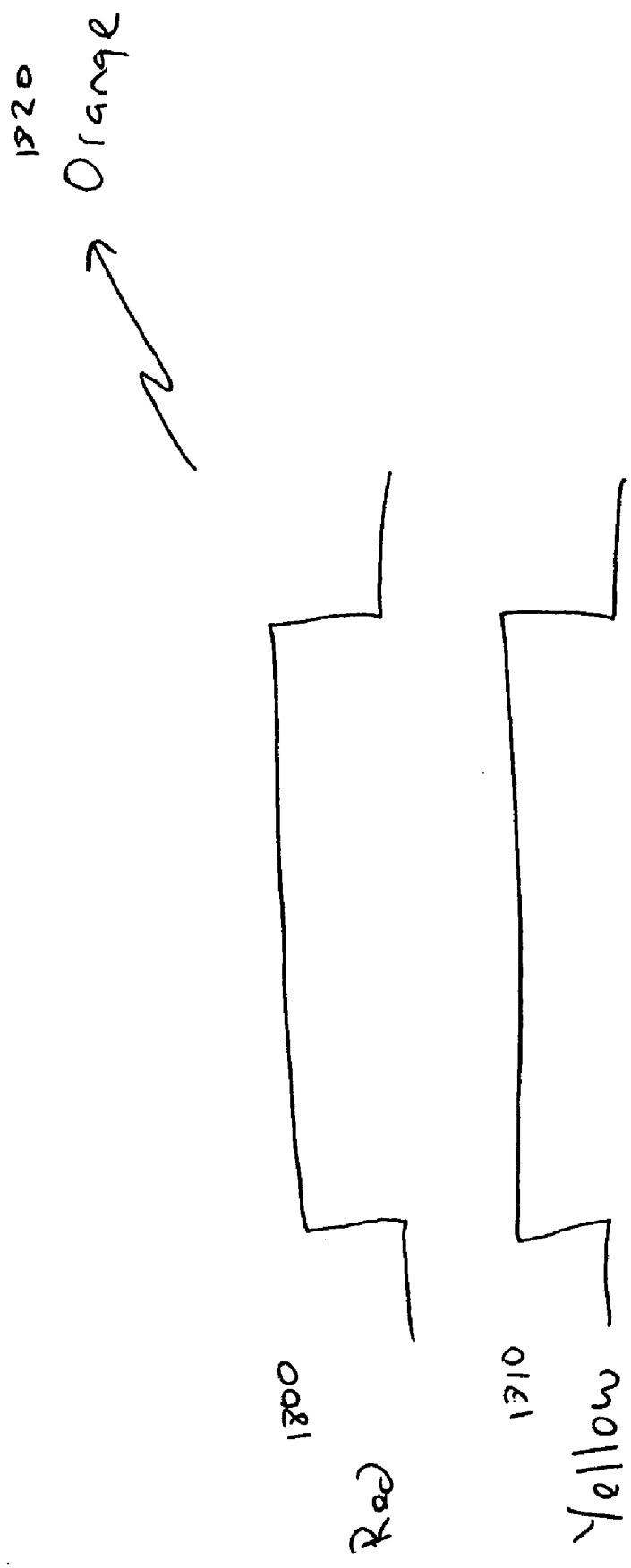
FIG. 18 illustrates illumination devices having two different colors being active at the same time to produce a third color.

FIGS. 13-21 illustrate different numbers of LED's having various colors being used in different sequencing, timing and patterns to provide a variety of visual effects. Referring to FIG. 13, all of the LED's are the same color, red in this example. The LED's may also be blue, green, yellow and purple. Referring to FIG. 14, in an alternative embodiment, LED's are different colors, red and yellow in this example. FIGS. 15-17 illustrate one manner in which different colored LED's can be activated so that the alternator illuminates red light at one time, and yellow light at another time.

Figure 19:
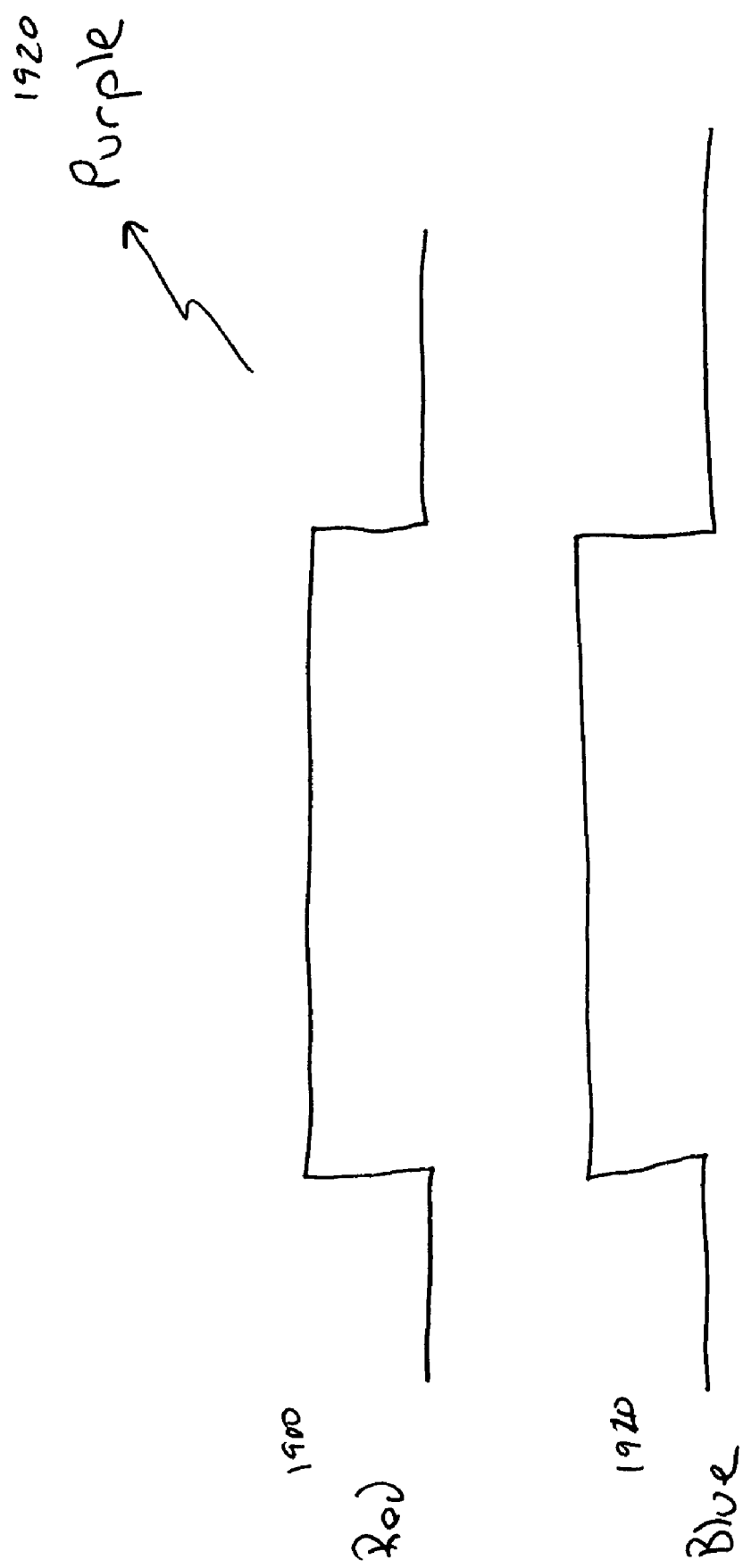
FIG. 19 further illustrates illumination devices having two different colors being active at the same time to produce a third color.

According to another embodiment, light from different LED's 160 can be mixed so that the light that is emitted through the alternator vents 115 has a different color. For example, referring to FIG. 18, light 1800 from a red LED and light 1810 from a yellow LED can mix to form orange light 1820, which radiates through the vents 115 of the alternator 100. Further, as shown in FIG. 19, light from a red LED 1900 and light from a blue LED 1910 can mix to form purple light 1920, which radiates through the vents 115 of the alternator 100.

Figure 20:
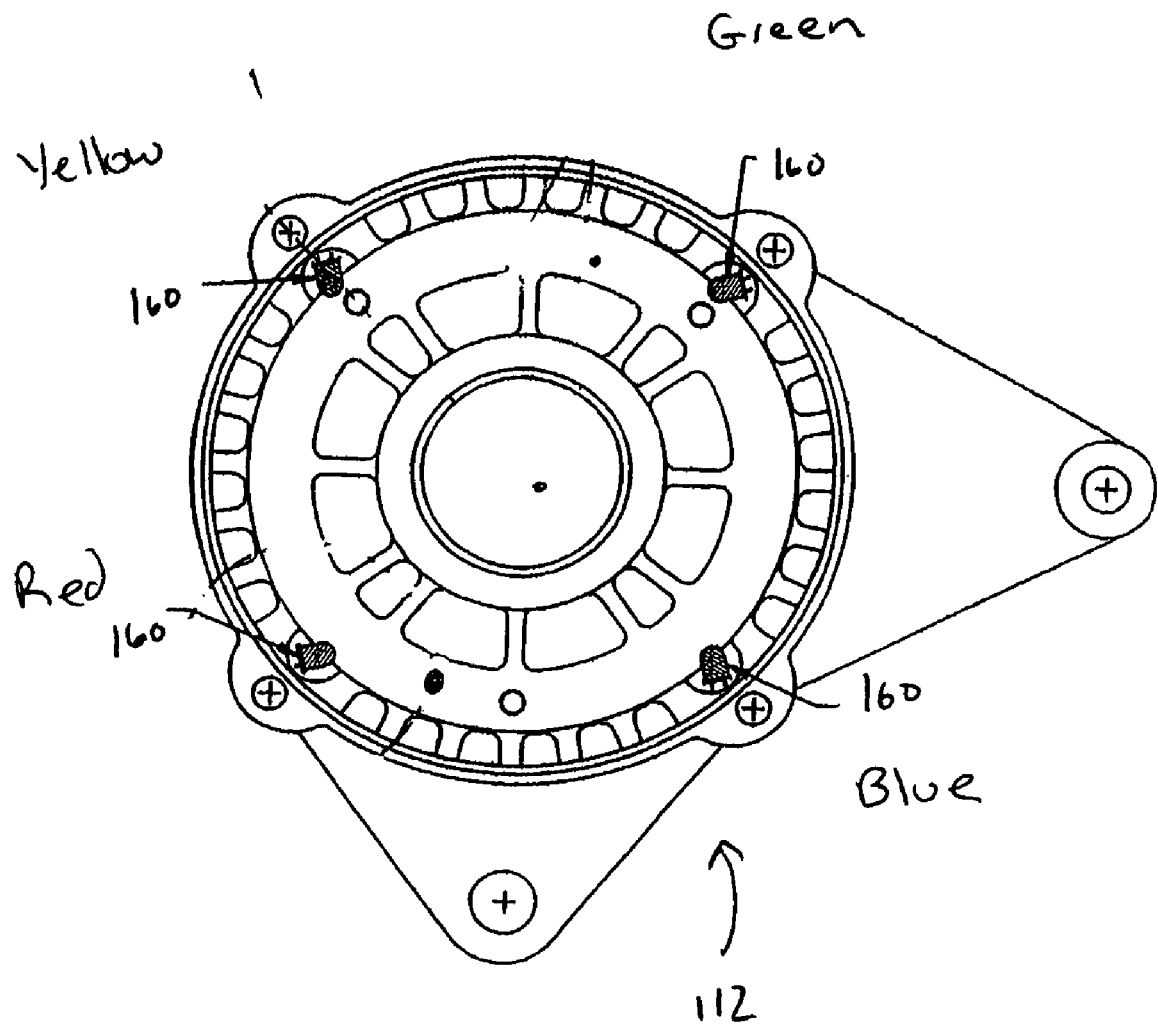
FIG. 20 illustrates an illuminated alternator having illuminations devices of different colors.
Figure 21:
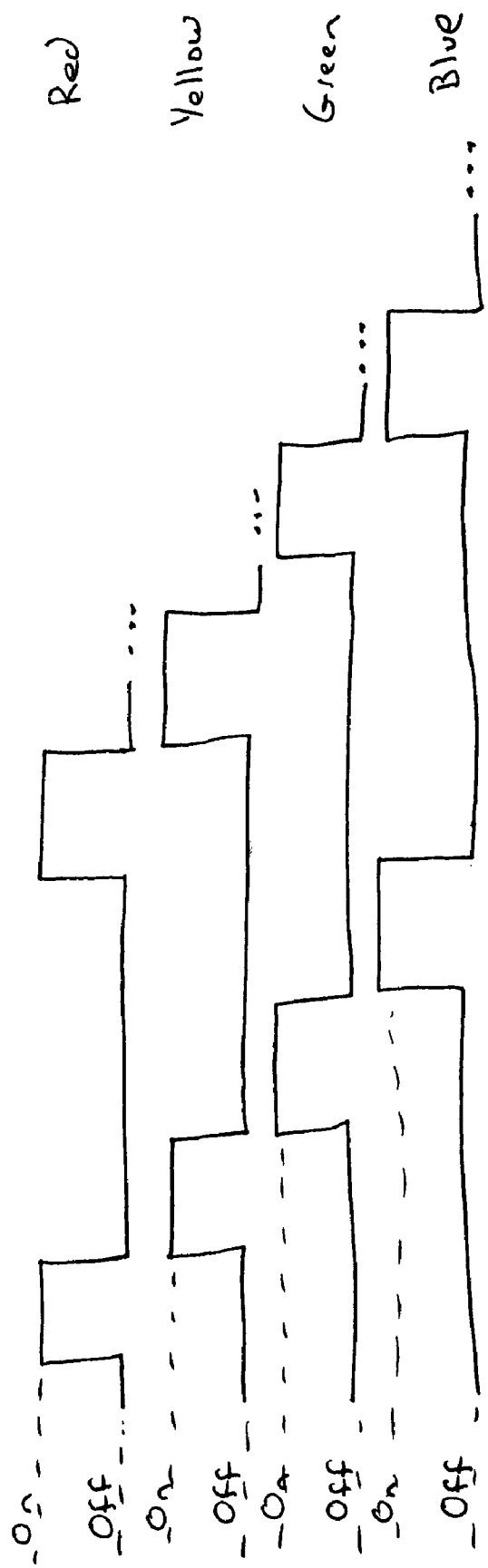
FIG. 21 illustrates activating illumination devices of different colors sequentially and separately.

FIG. 20 illustrates another embodiment of an illuminated alternator having multiple LED's 160, each of which emits light of a different color. These LED's 160 can be sequentially activated as shown in FIG. 21 so that each color is emitted sequentially and at different times. Alternatively, the LED's 160 can be activated so that two or more LED's are simultaneously active and in various other patterns and sequences.

In addition to the aesthetic visual effects that can be generated, alternative embodiments provide further aesthetic effects by coordinating the color of the light of the emitted from the alternator 100 with the color of the surface of the case 110 of the alternator 100. Thus, in one embodiment, the case 110 is aluminum and has a silver color, and the light emitted by the LED 160 is a different color. In another embodiment, the color of the light emitted by the LED 160 matches the color of the surface of the case 110.

Figure 22:
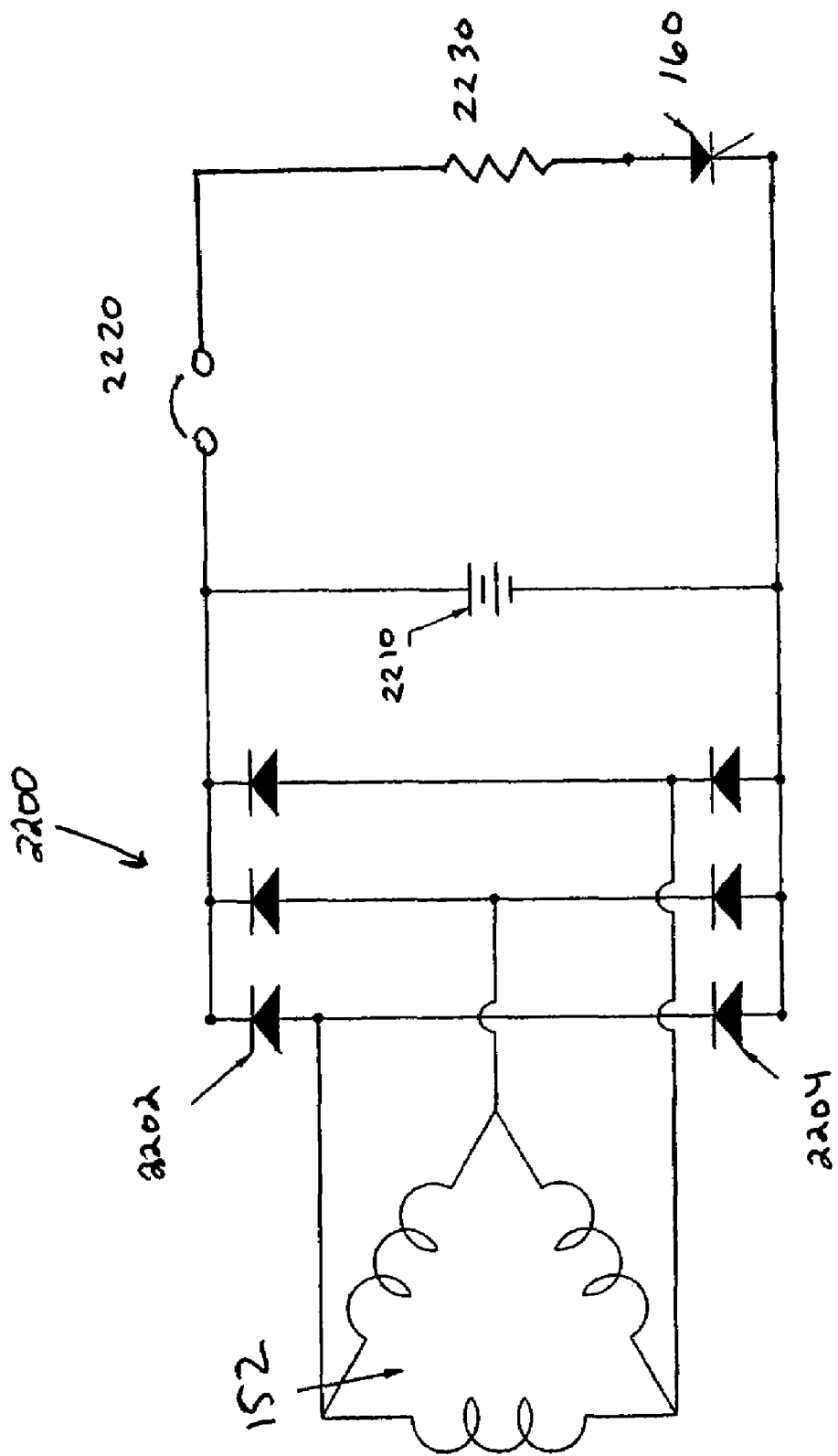
FIG. 22 is an electrical schematic of an illuminated alternator having one illumination device.

FIG. 22 is an electrical schematic showing how an LED 160 can be electrically connected to existing alternator components according to one embodiment. As shown in FIG. 22, windings 152 of the stator 150 are coupled to a rectifier bridge 2260, formed by positive rectifier diodes 2202 and negative rectifier diodes 2264, which are connected in parallel to a battery 2210. The battery 2210 is coupled to a fuse 2220 (if necessary) and a resistor 2230. A suitable fuse 2200 is a 3-amp fuse, and the resistor 2230 is a 330 Ω resistor. Persons skilled in the art will appreciate that other component values may be suitable for use in other systems. Thus, the LED 160 is wired in parallel to the battery 2210, wired in parallel positive rectifier diodes 2202 and negative rectifier diodes 2204 and wired in series with the fuse 2220 and the resistor 2230.

Figure 23:
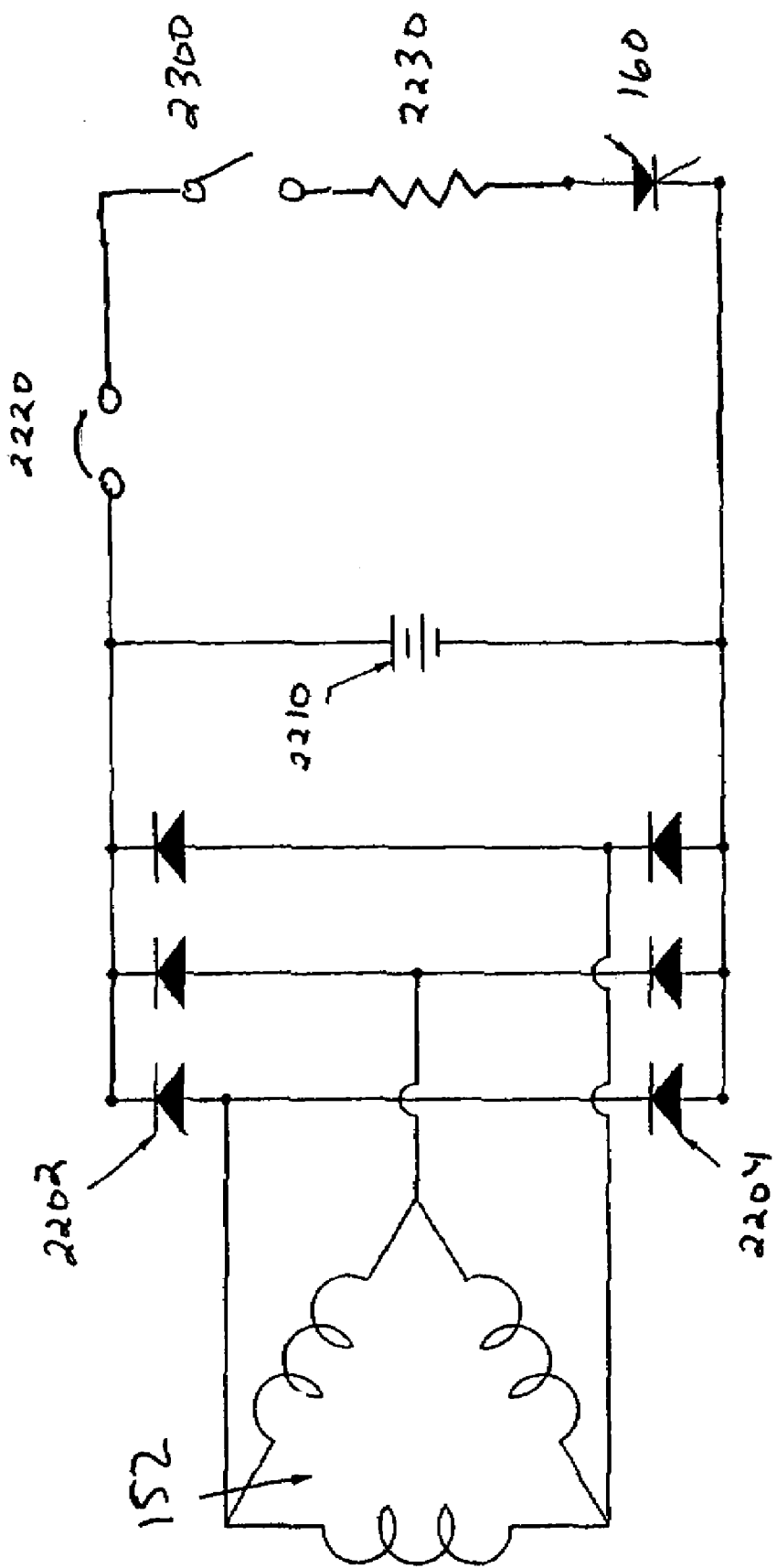
FIG. 23 is an electrical schematic of an illuminated alternator having one illumination device and a switch to selectively enable the illumination device.

Referring to FIG. 23; according to an alternative embodiment, a toggle switch 2300 is used to provide the ability to manually enable and disable the LED 160. For this purpose, the switch 2300 can be mounted on the exterior of the cover 110 and wired into the electrical components as shown in FIG. 23. For example, the switch 2300 can be mounted to the drive end frame cover 112 or the rear end frame cover 114, to allow a person to manually actuate the switch 2300.

Figure 8:
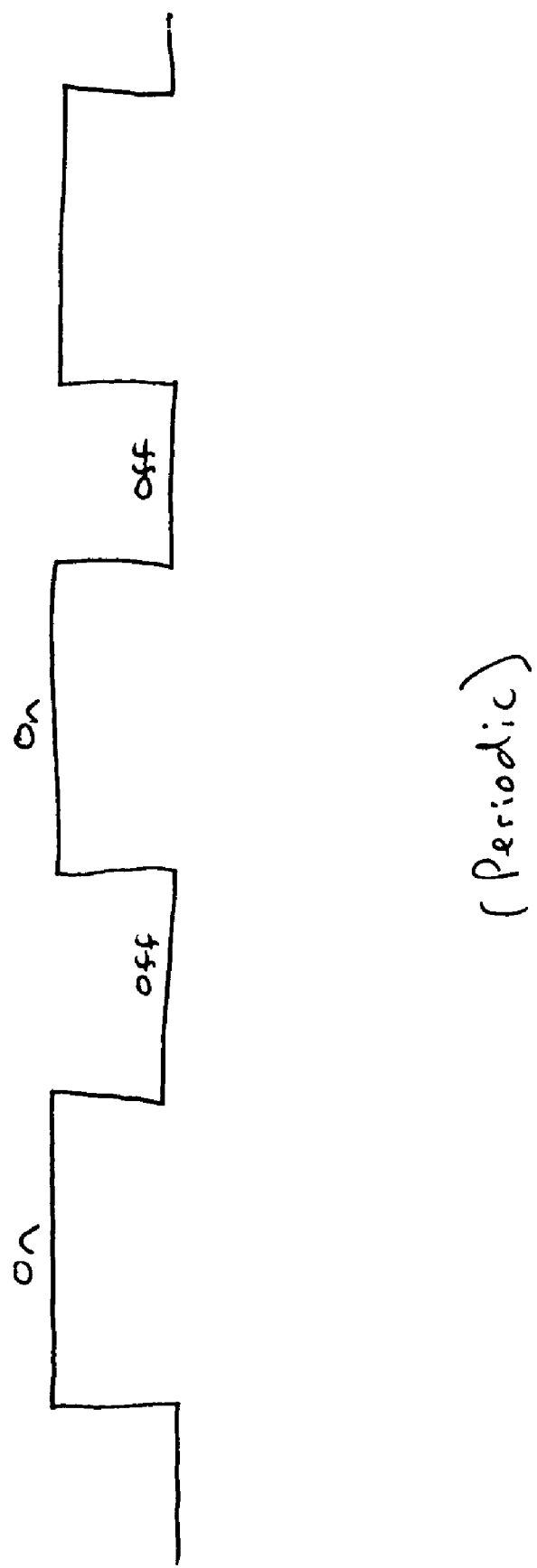
FIG. 8 illustrates illumination devices being activated periodically.
Figure 24:
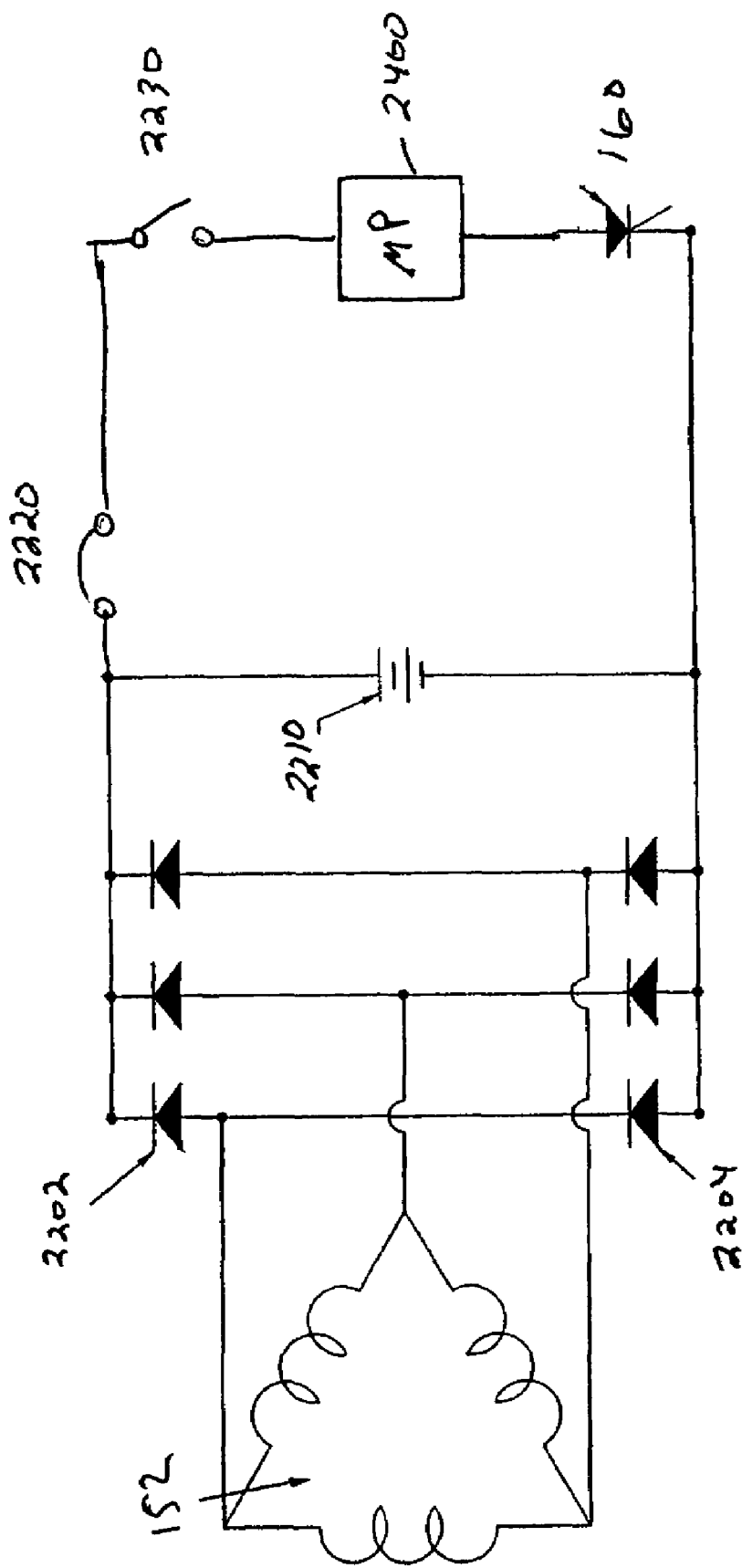
FIG. 24 is an electrical schematic of an illuminated alternator having one illumination device and a controller.

Referring to FIG. 24, according to another alternative embodiment, a microprocessor 2400, micro-controller or other suitable controller or driver can be programmed to control the LED 160, e.g., the voltage provided to the LED 160 and whether the LED 160 is operated continuously, periodically or intermittently using, for example, driving signals shown in FIG. 8 or other suitable signals to activate and deactivate one or more LED's.

Figure 25:
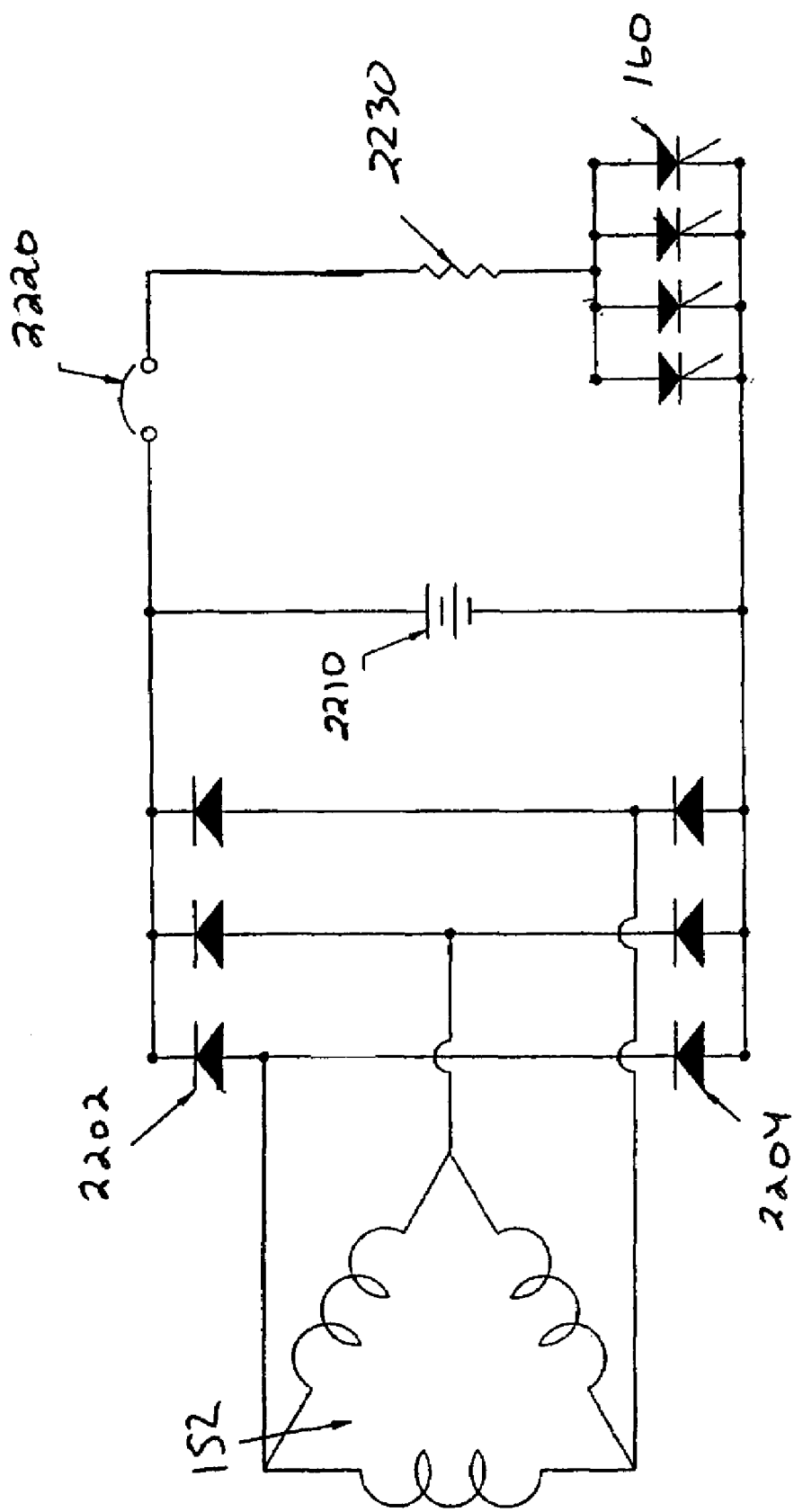
FIG. 25 is an electrical schematic of an illuminated alternator having multiple illumination devices.
Figure 26:
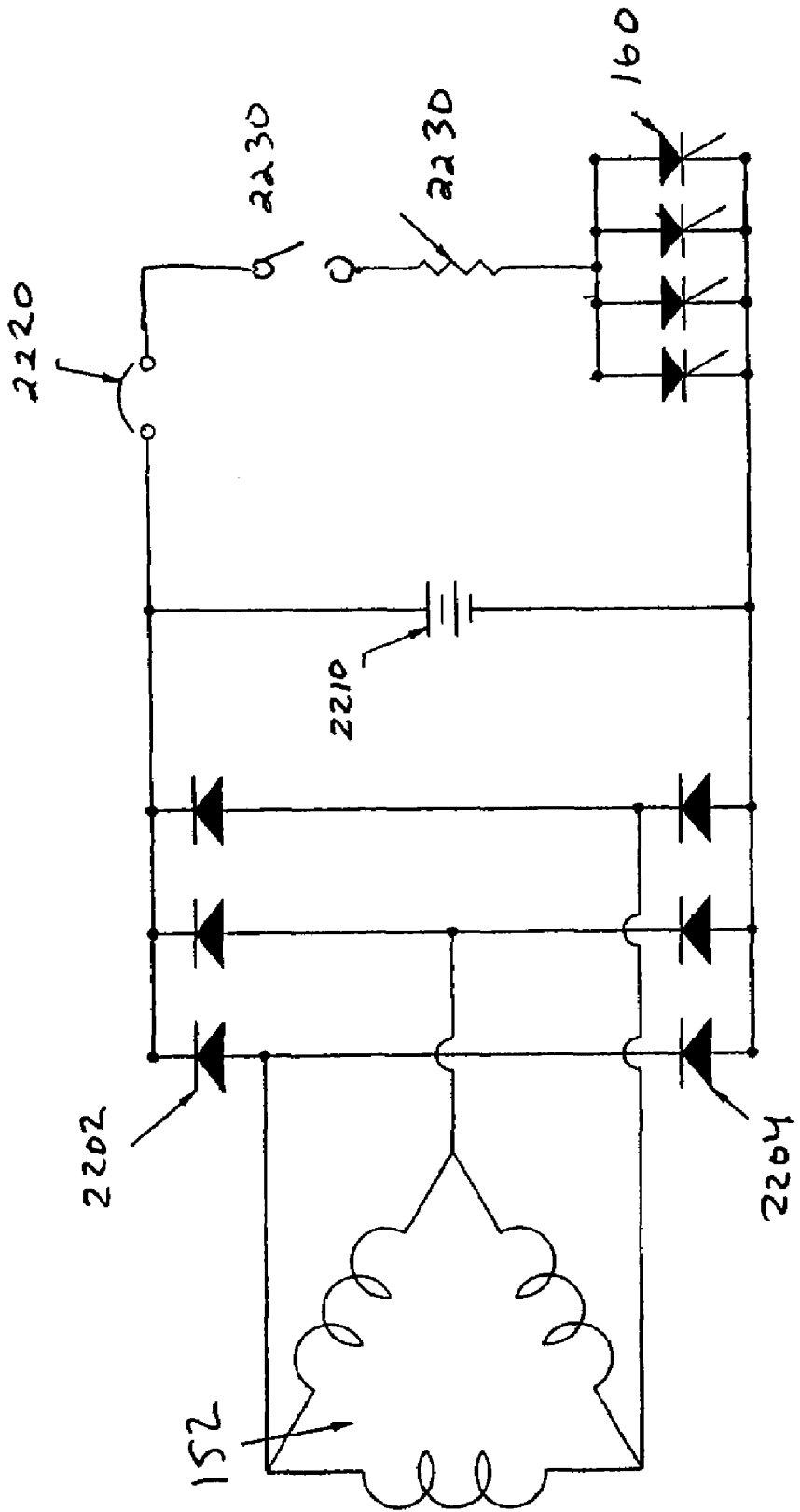
FIG. 26 is an electrical schematic of an illuminated alternator having multiple illumination devices and a switch to selectively enable the illumination devices.
Figure 27:
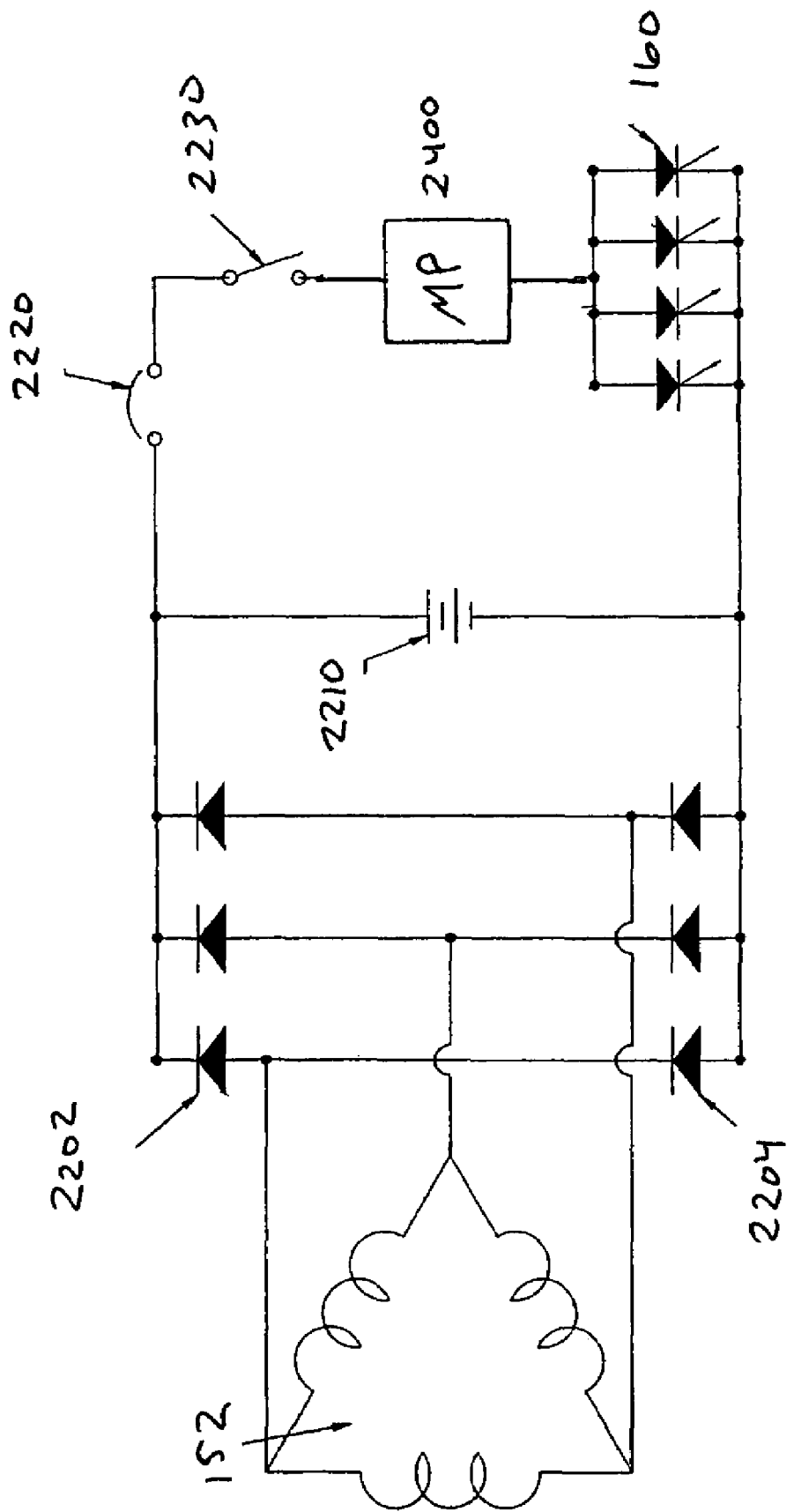
FIG. 27 is an electrical schematic of an illuminated alternator having multiple illumination devices and a controller.

FIGS. 25-27 illustrate similar configurations except that the electronics are wired for multiple LED's 160. Thus, the user can actuate a switch 2300 to manually enable or disable the LED's 160, and a microprocessor 2400 can be programmed to control multiple LED's 160, e.g., the sequence, duration, timing, pattern, etc. of one or more LED's 160 using, for example, driving signals shown in FIGS. 8, 10, 11, 12, 17-19 and 21 or other suitable signals to activate and deactivate one or more LED's.

Embodiments provide significant improvements over known alternators by providing an illuminated alternator that provides aesthetic effects and allows persons to further customize their vehicles. These enhancements are achieved without sacrificing the performance of the alternator. While embodiments are susceptible to various modifications, and alternative forms, specific examples thereof have been shown in the drawings and are herein described in detail. For example, illuminated alternators can be included in various types of motor vehicles. Embodiments can also be used with new and re-manufactured alternators.

Further, LED's can be various types of lighting devices including, but limited to, one or more halogen, fluorescent, plasma, HID, light emitting diode, laser, and neon sources or combinations thereof and other types of lighting elements that can be integrated within an alternator. These LED's can have various colors and be activated in different sequences and patterns. Further, rather than having an illumination device inside the alternator, the illumination device can be positioned outside of the alternator, e.g. mounted to an exterior surface of the alternator. Also, an illumination device can be included in the rear end frame cover, and cal also be included in both drive end and rear end frame covers. There may also be illumination devices both inside and outside of the alternator. Thus, embodiments are not limited to alternators having only internal illumination devices Accordingly, it should be understood, that the embodiments described herein are not limited to the particular configurations disclosed, but cover all modifications, equivalents and alternatives falling within the scope of the appended claims.

What is claimed:

1. An illuminated alternator for a motor vehicle, the alternator including a shaft, a pulley attached to the shaft, a rotor attached to the shaft, and a stator, the rotor rotating within the stator and being driven by an engine belt that drives the pulley, the illuminated alternator comprising:
   an alternator case including one or more vents defining an opening in the alternator case;
   the alternator disposed within and circumferentially surrounded by the alternator case, the alternator further including one or more electrical components; and
   an illumination device electrically connected to the one or more electrical components of the alternator and disposed adjacent to the one or more vents of the alternator case, the illumination device being disposed within the alternator case,
   wherein the illumination device generates light when activated, light from the illumination device being visible through the one or more vents of the alternator case.

2. The illuminated alternator of claim 1, light emitted from the illumination device being reflected by an inner surface of the alternator case and radiating through the one or more vents.

3. The illuminated alternator of claim 1, the alternator case comprising a drive end cover.

4. The illuminated alternator of claim 3, further comprising an end frame cover connected to the drive end cover to enclose the inner components of the alternator, including the illumination device, the stator and the rotor.

5. The illuminated alternator of claim 1, the alternator case including a mounting flange for attachment of the alternator to an engine of the motor vehicle.

6. The illuminated alternator of claim 1, an inner surface of the alternator case defining a recess, the illumination device being positioned in the recess.

7. The illuminated alternator of claim 1, the illumination device emitting light continuously.

8. The illuminated alternator of claim 1, the illumination device emitting light periodically.

9. The illuminated alternator of claim 1, the illumination device emitting light randomly.

10. The illuminated alternator of claim 1, the illumination device emitting green, red, blue, yellow, or purple light.

11. The illuminated alternator of claim 1, the illumination device comprising a light emitting diode.

12. The illuminated alternator of claim 1, the illumination device comprising a laser or halogen bulb.

13. The illuminated alternator of claim 1, the illumination device being electrically connected in parallel to a battery of the motor vehicle.

14. The illuminated alternator of claim 1, the illumination device being electrically connected in parallel to a positive rectifier diode and a negative rectifier diode.

15. The illuminated alternator of claim 1, further comprising a switch to selectively enable the illumination device.

16. The illuminated alternator of claim 1, wherein a color of the alternator matches a color of light emitted by the illumination device.

17. The illuminated alternator of claim 1, further comprising one or more additional illumination devices, each illumination device generating light when activated, light from the illumination devices being visible through the one or more vents.

18. The illuminated alternator of claim 17 comprising about two to about eight illumination devices.

19. The illuminated alternator of claim 17, all of the illumination devices emitting light simultaneously.

20. The illuminated alternator of claim 17, the illumination devices being sequentially activated.

21. The illuminated alternator of claim 17, the illumination devices emitting light randomly.

22. The illuminated alternator of claim 17, the illumination devices emitting light continuously.

23. The illuminated alternator of claim 17, the illuminated devices emitting light periodically.

24. The illuminated alternator of claim 17, the illuminated devices emitting the same color of light.

25. The illuminated alternator of claim 17, at least one illumination device emitting light having a color that differs from a color of light emitted by another illumination device.

26. The illuminated alternator of claim 17, the illumination devices being arranged symmetrically around an inner perimeter of the alternator case.

27. The illuminated alternator of claim 17, light that is emitted through one or more vents being a color that differs from at least two other colors of light emitted by two other illumination devices.

28. An illuminated alternator for a motor vehicle, the alternator including a shaft, a pulley attached to the shaft, a stator, and a rotor that rotates within the stator and is driven by a belt that drives a pulley, the illuminated alternator comprising:
  an alternator frame defining a plurality of vents;
  a plurality of light emitting diodes enclosed by the alternator frame and electrically connected to one or more electrical components of the alternator and disposed adjacent to the plurality of vents of the alternator frame, each light emitting diode emitting light when activated, light from the light emitting diodes being reflected by an inner surface of the alternator frame and radiating from the alternator frame through at least one of the plurality of vents of the alternator frame.

29. The illuminated alternator of claim 28, the alternator frame comprising a drive end frame cover.

30. The illuminated alternator of claim 28, further comprising a rear end frame cover connected to the drive end frame cover to enclose the inner components of the alternator, including the light emitting diodes, the stator and the rotor.

31. The illuminated alternator of claim 28, the alternator frame including a mounting flange for attachment of the alternator to an engine of the motor vehicle.

32. The illuminated alternator of claim 28, an inner surface of the alternator frame defining a recess, each light emitting diode being positioned in a recess.

33. The illuminated alternator of claim 28, the light emitting diodes being arranged symmetrically around an inner perimeter of the alternator frame.

34. The illuminated alternator of claim 28, the light emitting diodes emitting light continuously.

35. The illuminated alternator of claim 28, the light emitting diodes emitting light simultaneously.

36. The illuminated alternator of claim 28, the light emitting diodes emitting light periodically.

37. The illuminated alternator of claim 28, the light emitting diodes emitting light randomly.

38. The illuminated alternator of claim 28, the light emitting diodes emitting green, red, blue, yellow or purple light.

39. The illuminated alternator of claim 28, the light emitting diodes emitting the same color of light.

40. The illuminated alternator of claim 28, at least one light emitting diode emitting light having a color that differs from a color of light emitted by another light emitting diode.

41. The illuminated alternator of claim 28, light emitted through one or more vents being a color that differs from at least two other colors of light emitted by other light emitting diodes.

42. The illuminated alternator of claim 28, a color of the alternator frame matching a color of light emitted by the light emitting diodes.

43. The illuminated alternator of claim 28, the light emitting diodes being connected to each other in parallel.

44. The illuminated alternator of claim 28, the light emitting diodes being coupled in parallel to a battery.

45. The illuminated alternator of claim 28, the light emitting diodes being connected in parallel to a positive rectifier diode and a negative rectifier diode.

46. The illuminated alternator of claim 28, further comprising a switch to selectively enable the light emitting diodes.

47. An illuminated alternator for a motor vehicle, the alternator including a shaft, a pulley attached to the shaft, a stator, and a rotor that rotates within the stator and is driven by a belt that drives the pulley, the illuminated alternator comprising:
  a drive end frame cover defining a plurality of vents;
  a plurality of light emitting diodes electrically connected to one or more electrical components of the alternator and disposed adjacent to the plurality of vents, each light emitting diode being positioned in a recess defined in an inner surface of the drive end frame cover and emitting light when activated,
  light from the light emitting diodes being reflected by an inner surface of the drive end frame cover and radiating from the drive end frame cover through at least one of the plurality of vents of the drive end frame cover.

48. The illuminated alternator of claim 47, further comprising a rear end cover connected to the drive end frame cover to enclose the inner components of the alternator, including the light emitting diodes, the stator and the rotor.

49. The illuminated alternator of claim 47, the drive end frame cover including a mounting flange for attachment of the alternator to an engine of the motor vehicle.

50. The illuminated alternator of claim 47, the light emitting diodes being arranged symmetrically around an inner perimeter of the drive end frame cover.

51. The illuminated alternator of claim 47, the light emitting diodes being connected in parallel to a positive rectifier diode and a negative rectifier diode.

52. The illuminated alternator of claim 47, further comprising a switch to selectively enable the light emitting diodes.

53. An illuminated alternator for a motor vehicle, the alternator including a shaft, a pulley attached to the shaft, a stator, and a rotor that rotates within the stator and is driven by a belt that drives the pulley, the illuminated alternator comprising:

a drive end frame cover defining a plurality of vents and a plurality of recesses in an inner surface thereof;

a plurality of light emitting diodes electrically connected to one or more electrical components of the alternator and disposed adjacent to the plurality of vents, a light emitting diode being positioned in a recess defined in the inner surface of the drive end frame cover and emitting light when activated, the light emitting diodes being arranged symmetrically around an inner perimeter of the drive end frame cover, a rear end frame cover connected to the drive end frame cover to enclose the inner components of the alternator, including the light emitting diodes, the stator and the rotor, light from the light emitting diodes being reflected by an inner surface of the drive end frame cover and radiating from the drive end frame cover through at least one of the plurality of vents of the drive end frame cover.

* * * * *